(12) United States Patent
Kimura

(10) Patent No.: US 7,616,386 B2
(45) Date of Patent: Nov. 10, 2009

(54) ZOOM LENS AND IMAGE-PICKUP APPARATUS

(75) Inventor: Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/255,802

(22) Filed: Oct. 22, 2008

(65) Prior Publication Data

US 2009/0109548 A1  Apr. 30, 2009

(30) Foreign Application Priority Data

Oct. 29, 2007  (JP) ............... 2007-280207

(51) Int. Cl.
*G02B 15/14* (2006.01)
(52) U.S. Cl. ...................... 359/690; 359/687
(58) Field of Classification Search ................ 359/687, 359/689, 690
See application file for complete search history.

(56) References Cited

U.S. PATENT DOCUMENTS

| | | | |
|---|---|---|---|
| 5,963,378 A | 10/1999 | Tochigi et al. | |
| 6,867,925 B1 | 3/2005 | Sato | |
| 6,975,461 B2 | 12/2005 | Eguchi | |
| 7,407,334 B2 | 8/2008 | Sato | |
| 2007/0139789 A1* | 6/2007 | Itoh | ............ 359/687 |

FOREIGN PATENT DOCUMENTS

| | | |
|---|---|---|
| JP | 06-148523 A | 5/1994 |
| JP | 07-270684 A | 10/1995 |
| JP | 2000-347102 A | 12/2000 |
| JP | 2003-315676 A | 11/2003 |
| JP | 2006-084887 A | 3/2006 |
| WO | 2007/032505 A1 | 3/2007 |

* cited by examiner

*Primary Examiner*—Scott J Sugarman
(74) *Attorney, Agent, or Firm*—Canon U.S.A., Inc., IP Division

(57) ABSTRACT

A zoom lens achieves a high zoom ratio and high optical performance in an entire zoom range. The zoom lens includes, in order from an object side to an image side, a first lens unit having a positive refractive power, a second lens unit having a negative refractive power, and a rear unit which includes at least one lens unit. At least the second lens unit is moved during zooming such that a distance between the first and second lens units is larger at a telephoto end than at a wide-angle end. The first lens unit includes at least a first lens element made of a material which satisfies $Nd1a > 2.3 - 0.01 \cdot vd1a$ and $1.65 < Nd1a < 2.70$. The first and second lens units satisfy $2.5 < |f1/f2| < 12.0$.

10 Claims, 15 Drawing Sheets

ZOOM LENS AND IMAGE-PICKUP APPARATUS

BACKGROUND OF THE INVENTION

The present invention relates to a zoom lens and an image-pickup apparatus, and more particularly to an image-pickup apparatus, such as a video camera, an electronic still camera, a broadcasting camera, or a monitoring camera, which uses a solid-state image-pickup element.

A high function has been achieved for the image-pickup apparatus, such as a video camera, a digital still camera, a broadcasting camera, a monitoring camera, or a silver-haloid film, which uses the solid-state image-pickup element to miniaturize the entire apparatus.

The image-pickup apparatus requires, as an image-pickup optical system to be used, a zoom lens short in total length and compact, and having a high zoom ratio (large magnification) and a high resolving power.

To meet such a requirement, a zoom lens has been developed which includes, in order from an object side to an image side, a first lens unit having a positive refractive power, a second lens unit having a negative refractive power, and a rear unit including at least one lens unit disposed further on the image side than the second lens unit (Japanese Patent Laid-Open No. [U.S. Pat. No. 5,0963,378], Japanese Patent Laid-Open No. 2000-347102 [U.S. Pat. No. 6,867,925], Japanese Patent Laid-Open No. 2003-315676 [U.S. Pat. No. 6,975,461], and Japanese Patent Laid-Open No. 6-148523).

Lens configurations of the rear unit have been known which include a configuration formed by one lens unit of a positive refraction power, a configuration formed by plural lens units of positive refractive powers, and a configuration formed by at least one lens unit of a positive refractive power and one lens unit of a negative refractive power.

The zoom lenses of such types perform zooming by moving the second lens unit and after to enlarge or reduce an image formed by the first lens unit.

A zoom lens of a positive-lead type in which a first lens unit has a positive refractive power enables easier acquisition of a higher zoom ratio as compared with a negative-lead type in which a first lens unit has a negative refractive power.

Transparent (transmissive) ceramics has recently been developed, resulting in an image-pickup optical system which uses the transparent ceramics as an optical material. The transparent ceramics has a refractive index, hardness, and strength higher than those of optical glasses. An image-pickup apparatus that uses these characteristics to thin the entire lens system has been developed (Japanese Patent Laid-Open No. 2006-84887 [U.S. Publication No. 2006/0062569]).

The zoom lens used for the image-pickup apparatus is strongly required to be high in zoom ratio and compact in entire lens system.

Generally, to miniaturize the zoom lens, the number of lenses only has to be reduced while a refractive power of each lens unit constituting the zoom lens is increased.

However, once the zoom lens is configured this way, a lens thickness increases to make inadequate a reduction effect of the lens system and simultaneously difficult correction of various aberrations.

Thus, to achieve a high zoom ratio and compactness of the entire lens system, a zoom type, a refractive power of each lens unit, and a configuration of each lens unit have to be appropriately set.

A material used for the lens has to be selected, in view of a refractive index and an Abbe number, such that various aberrations including a chromatic aberration can be reduced at each zoom position.

For example, to achieve a high zoom ratio while miniaturizing the entire zoom lens system of the positive-lead type, an appropriate material has to be selected for a lens element(s) in the first lens unit in view of the refractive index and Abbe number.

The image-pickup apparatus disclosed in Japanese Patent Laid-Open No. 2006-84887 [U.S. Publication No. 2006/0062569]) uses the transparent ceramic for a material of a negative lens element in a cemented lens element in which a positive lens element and the negative lens element are cemented to reduce a lens thickness, thereby miniaturizing the entire lens system.

The image-pickup apparatus disclosed in Japanese Patent Laid-Open No. 2006-84887 [U.S. Publication No. 2006/0062569] is designed based on recognition that ceramics has a refractive index, hardness, and flexural strength higher than those of optical glasses, which enables miniaturization by an amount equal to one thinned negative lens.

In the optical glasses, generally, when the refractive indexes and Abbe numbers thereof are mapped on a graph (hereinafter referred to as "nd-vd diagram") respectively to be larger in value upward on a vertical axis and larger in value leftward on a horizontal axis, the refractive indexes and the Abbe numbers are distributed almost along several straight lines.

Generally, the optical glasses have characteristics in which a larger refractive index provides a smaller Abbe number, resulting in increase of dispersion.

On the other hand, some ceramics of high transmittance in a visible light wavelength region and some oxide monocrystals or polycrystals are present in a region where the relationship between the refractive index and the Abbe number is different from that of a normal optical glass in the nd-vd diagram.

In other words, materials have been known which have refractive indexes higher than that of the optical glass having an Abbe number equal to the materials.

Use of materials having such a relationship between the refractive index and the Abbe number different from that of the normal optical glass, such as ceramics and oxide monocrystals or polycrystals, is advantageous for aberration correction and miniaturization of the entire optical system.

However, simple use of lens elements made of such materials in zoom lenses does not warrant easy acquisition of high optical performance in the entire zoom range.

To achieve a high zoom ratio and miniaturization of the entire lens system through use of the lens elements made of the above materials, a zoom type, a refractive power of each lens unit, and a configuration of each lens unit have to be appropriately set.

BRIEF SUMMARY OF THE INVENTION

The present invention provides a compact zoom lens and an image-pickup apparatus including the same, which can achieve a high zoom ratio and high optical performance in the entire zoom range by appropriately using lens elements made of materials such as transparent ceramics and oxide monocrystals or polycrystals where a relationship between a refractive index and an Abbe number is different from that of a normal optical glass.

The present invention provides as an aspect thereof a zoom lens including, in order from an object side to an image side, a first lens unit having a positive refractive power, a second lens unit having a negative refractive power, and a rear unit which includes at least one lens unit. At least the second lens unit is moved during zooming such that a distance between the first and second lens units is larger at a telephoto end than at a wide-angle end. The first lens unit includes at least a first lens element made of a material which satisfies the following conditions:

$$Nd1a > 2.3 - 0.01 \cdot vd1a$$

$$1.65 < Nd1a < 2.70$$

where $Nd1a$ denotes a refractive index for a d-line, and $vd1a$ denotes an Abbe number for the d-line. The first and second lens units satisfy the following condition:

$$2.5 < |f1/f2| < 12.0$$

where f1 denotes a focal length of the first lens unit, and f2 denotes a focal length of the second lens unit.

The present invention provides as another aspect thereof an image-pickup element including the above-described zoom lens, and a solid-state image-pickup element which receives an image formed by the zoom lens.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiments of zoom lenses and image-pickup apparatuses including the same will be described below.

The zoom lens of each embodiment includes, in order from an object side to an image side, a first lens unit having a positive refractive power, a second lens unit having a negative refractive power, and a rear unit including at least one lens unit.

During zooming, at least the second lens unit is moved such that a distance between the first and second lens units is larger at a telephoto end than at a wide-angle end.

The rear unit includes, in order from the object side to the image side, a third lens unit having a positive refractive power and a fourth lens unit having a positive refractive power.

Alternatively, the rear unit includes, in order from the object side to the image side, a third lens unit having a positive refractive power, a fourth lens unit having a negative refractive power, and a fifth lens unit having a positive refractive power.

Figure 1:
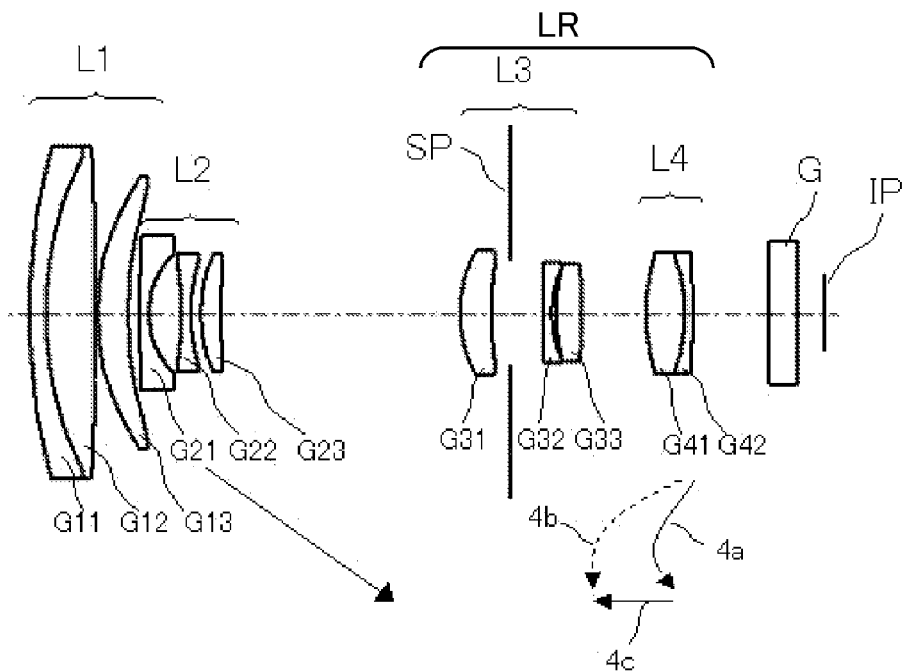
FIG. 1 is a sectional view of a zoom lens that is a first embodiment (Embodiment 1) of the present invention at a wide-angle end.
Figure 2:
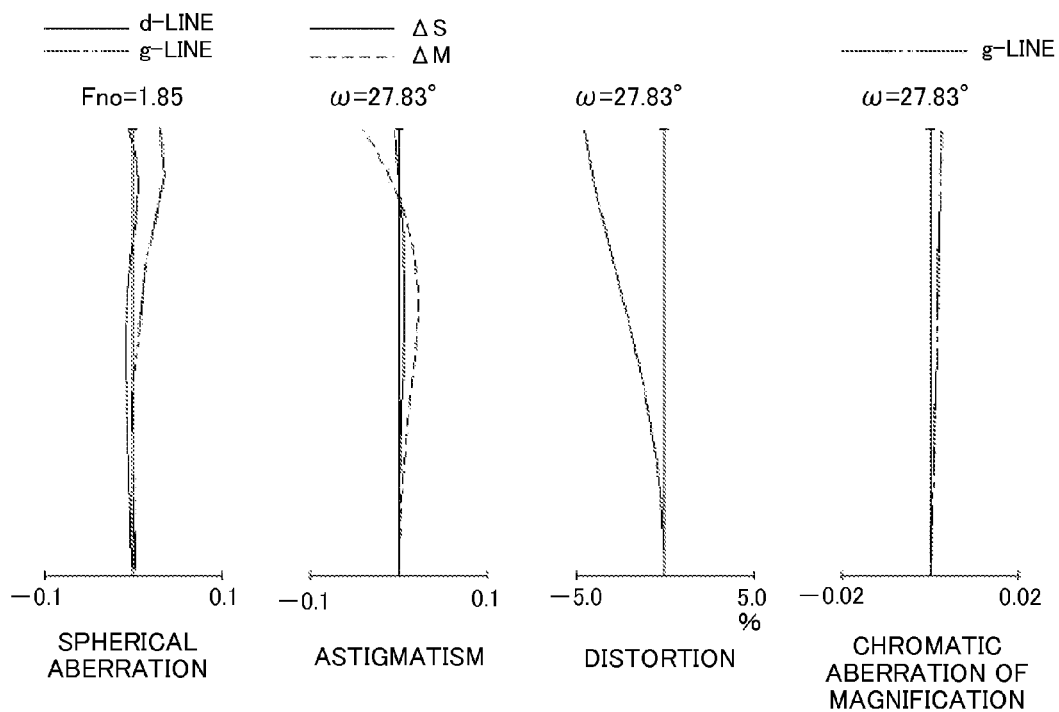
FIG. 2 is an aberration diagram of a numerical example of Embodiment 1 at the wide-angle end.
Figure 3:
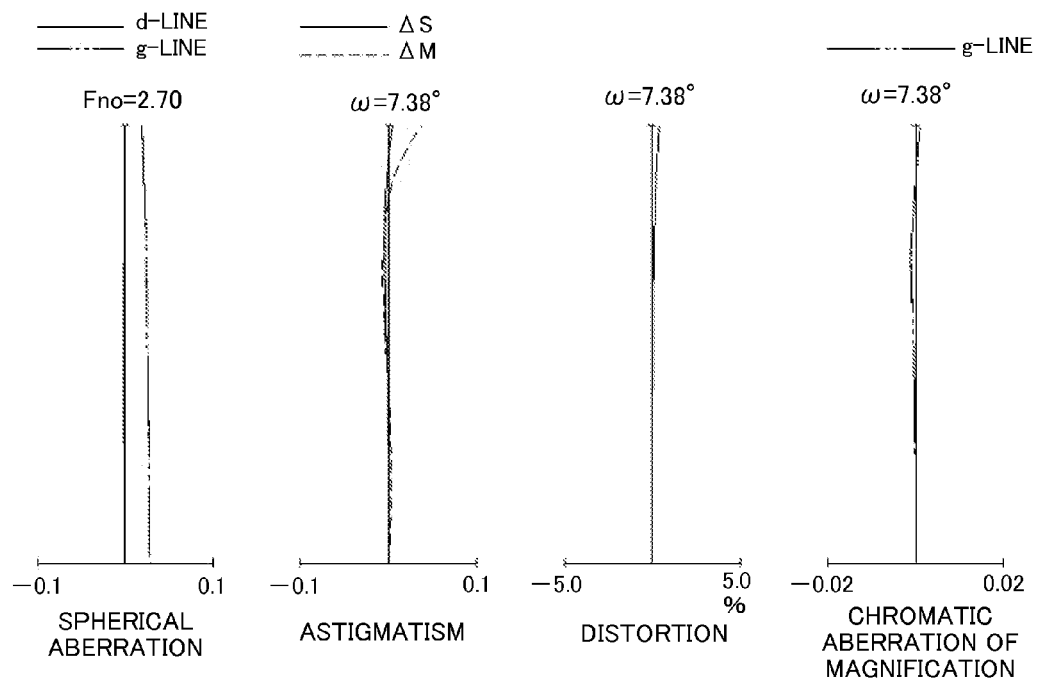
FIG. 3 is an aberration diagram of the numerical example of Embodiment 1 at a middle zoom position.
Figure 4:
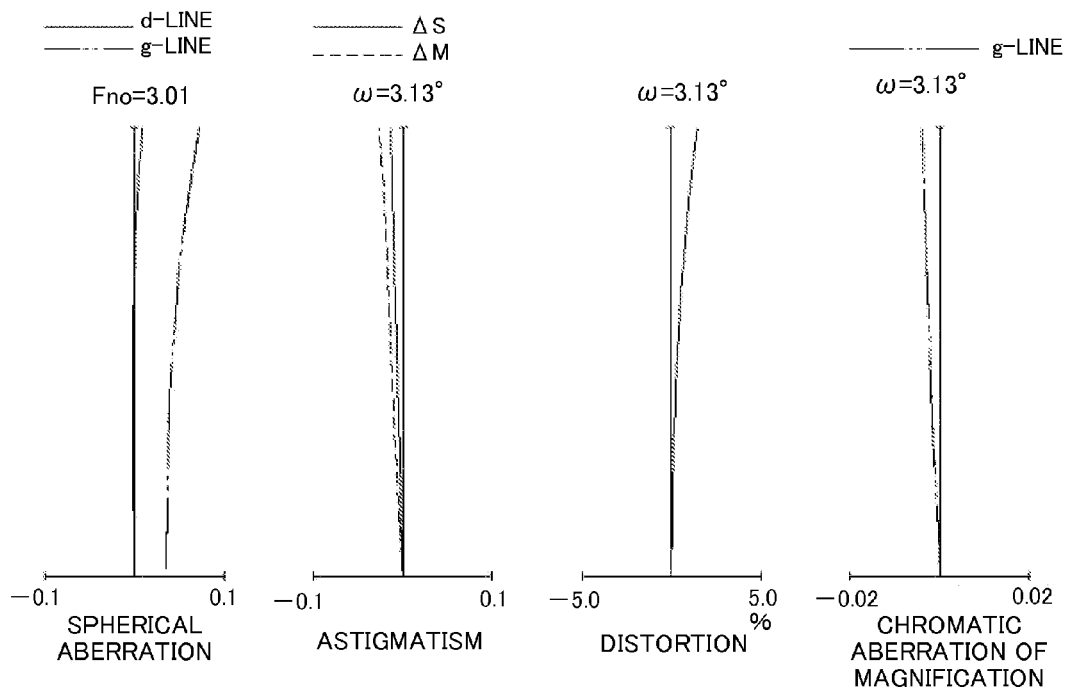
FIG. 4 is an aberration diagram of the numerical example of Embodiment 1 at a telephoto end.

FIG. 1 is a main-portion sectional view (lens sectional view) of the zoom lens of a first embodiment (Embodiment 1) at a wide-angle end (short focal length end). FIGS. 2 to 4 are aberration diagrams respectively at the wide-angle end, a middle zoom position (middle focal length position), and a telephoto end (long focal length end) of the zoom lens of a numerical example corresponding to Embodiment 1.

Figure 5:
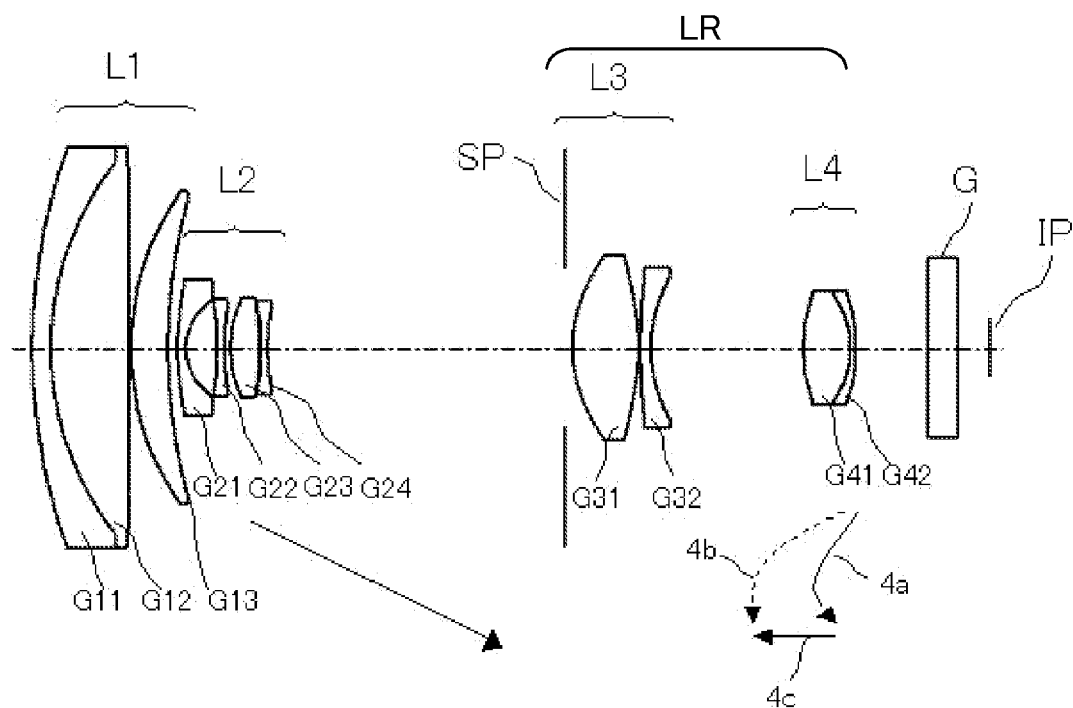
FIG. 5 is a sectional view of a zoom lens that is a second embodiment (Embodiment 2) of the present invention at a wide-angle end.
Figure 6:
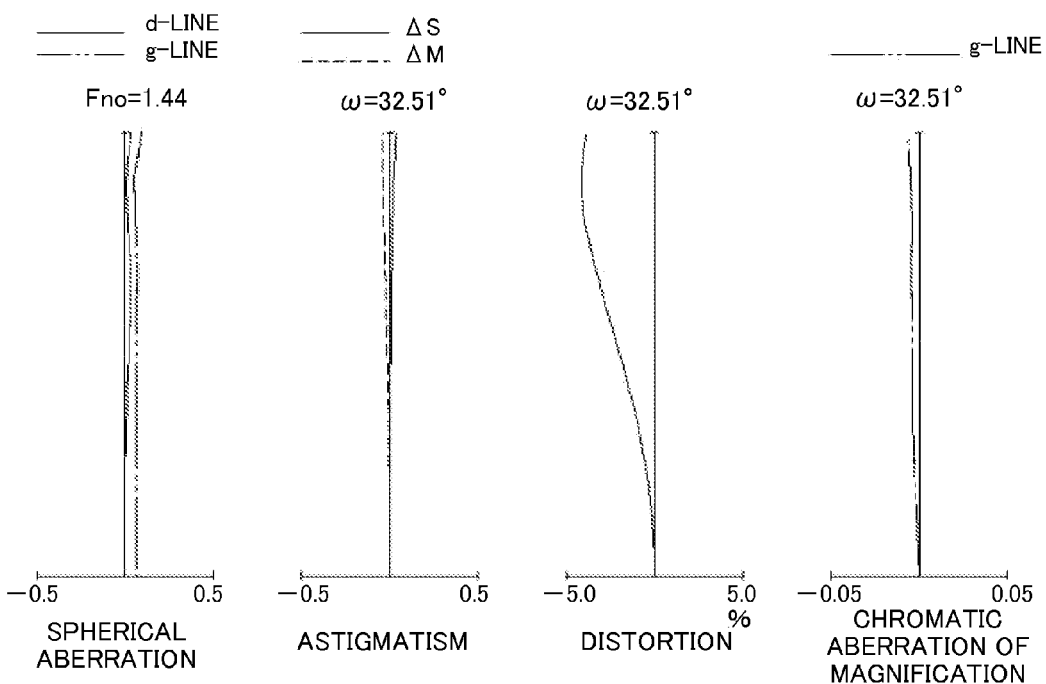
FIG. 6 is an aberration diagram of a numerical example of Embodiment 2 at the wide-angle end.
Figure 7:
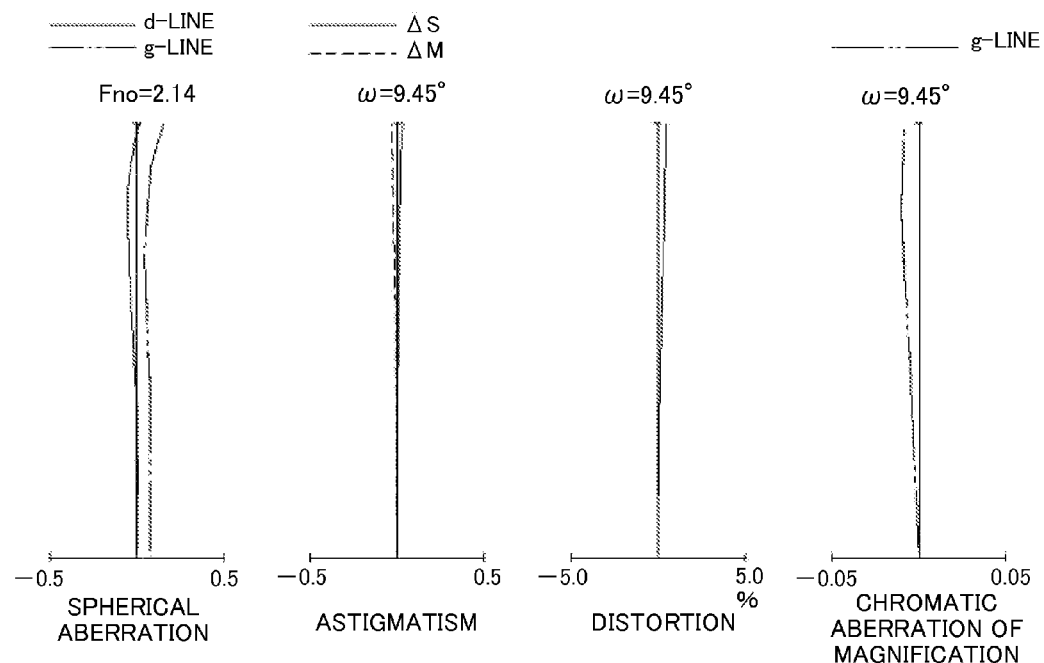
FIG. 7 is an aberration diagram of the numerical example of Embodiment 2 at a middle zoom position.
Figure 8:
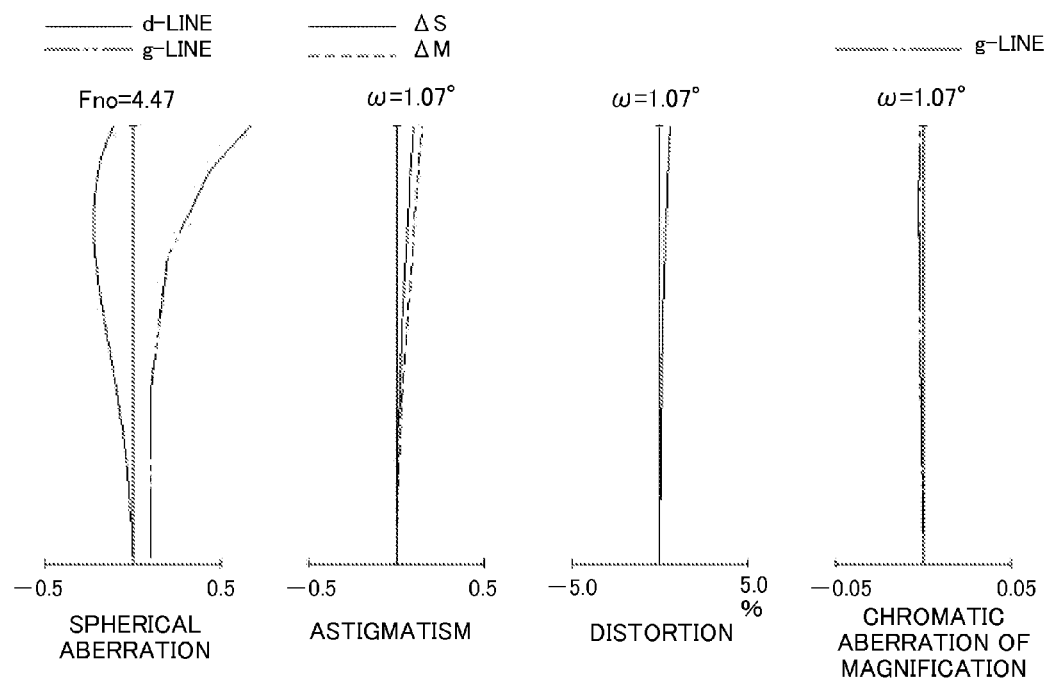
FIG. 8 is an aberration diagram of the numerical example of Embodiment 2 at a telephoto end.

FIG. 5 is a main-portion sectional view of a zoom lens of a second embodiment (Embodiment 2) at a wide-angle end. FIGS. 6 to 8 are aberration diagrams respectively at the wide-angle end, a middle zoom position, and a telephoto end of the zoom lens of a numerical example corresponding to Embodiment 2.

Figure 9:
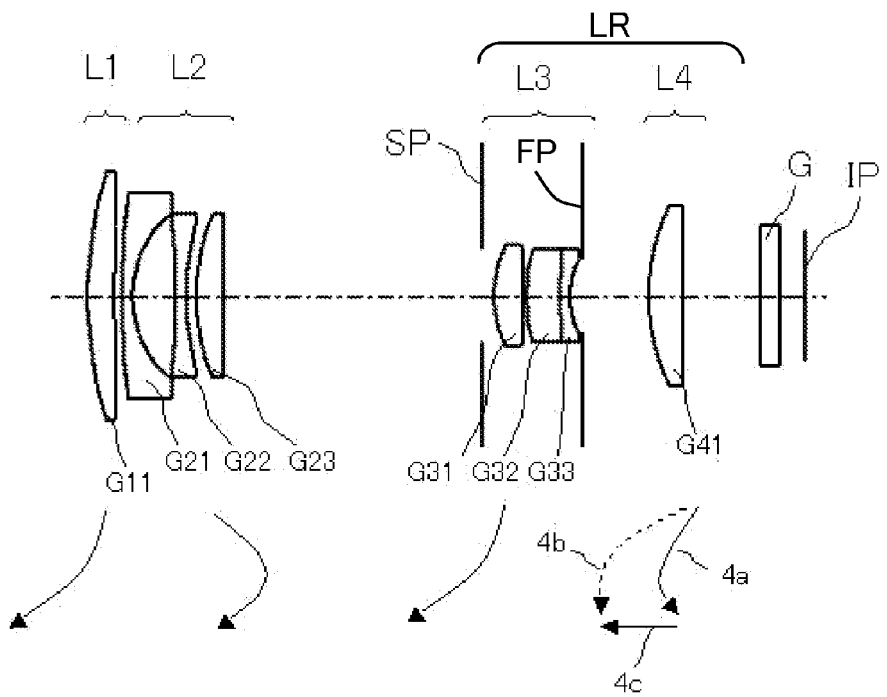
FIG. 9 is a sectional view of a zoom lens that is a third embodiment (Embodiment 3) of the present invention at a wide-angle end.

FIG. 9 is a main-portion sectional view of a zoom lens of a third embodiment (Embodiment 3) at a wide-angle end.

Figure 10:
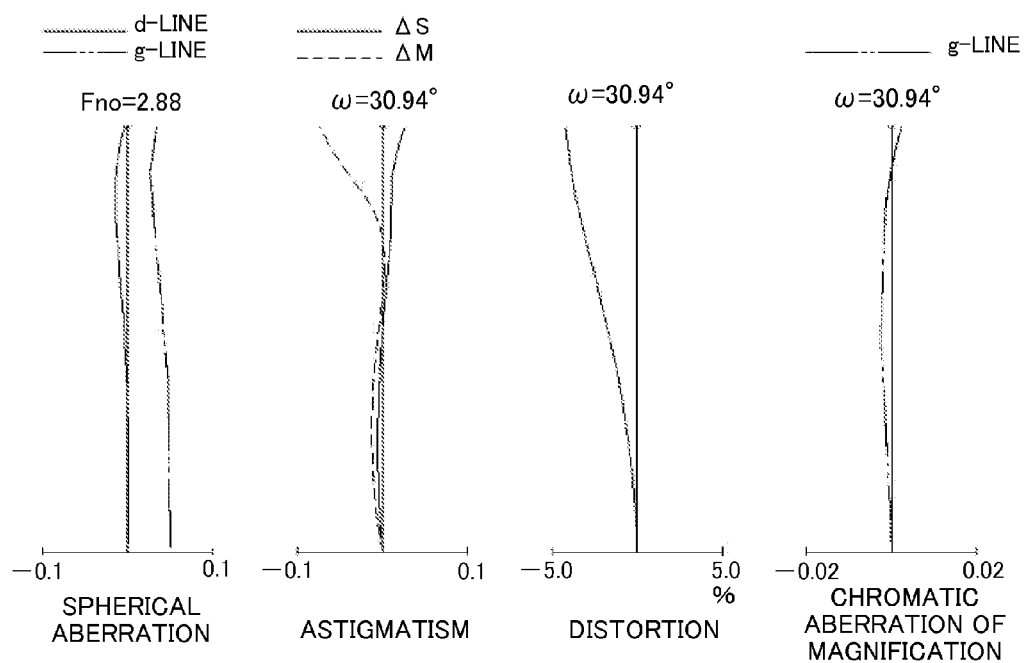
FIG. 10 is an aberration diagram of a numerical example of Embodiment 3 at the wide-angle end.
Figure 11:
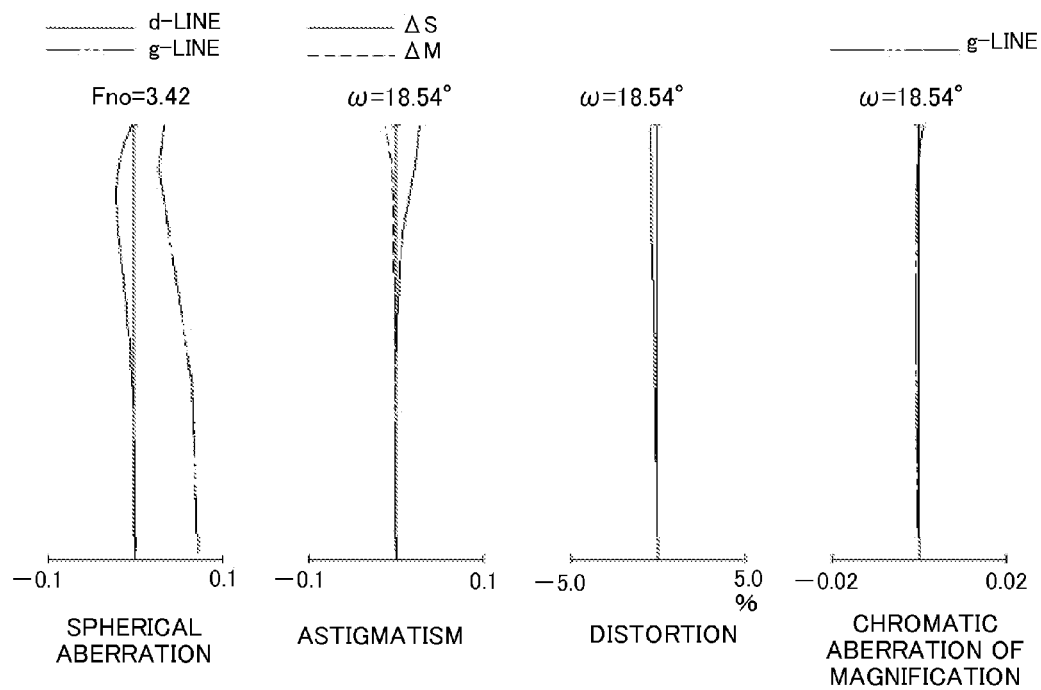
FIG. 11 is an aberration diagram of the numerical example of Embodiment 3 at a middle zoom position.
Figure 12:
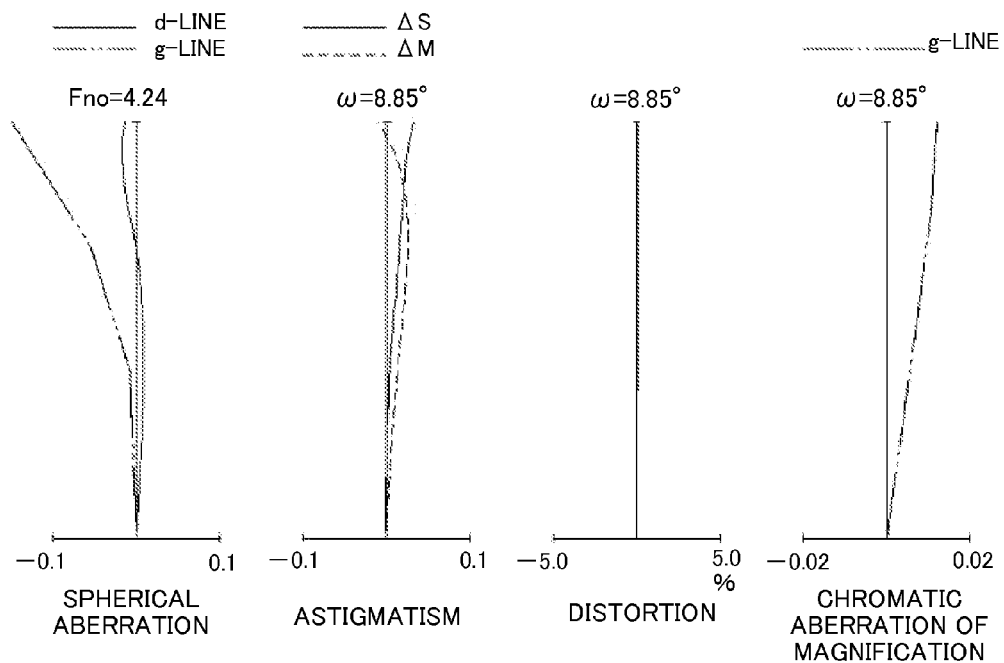
FIG. 12 is an aberration diagram of the numerical example of Embodiment 3 at a telephoto end.

FIGS. 10 to 12 are aberration diagrams respectively at the wide-angle end, a middle zoom position, and a telephoto end of the zoom lens of a numerical example corresponding to Embodiment 3.

Figure 13:
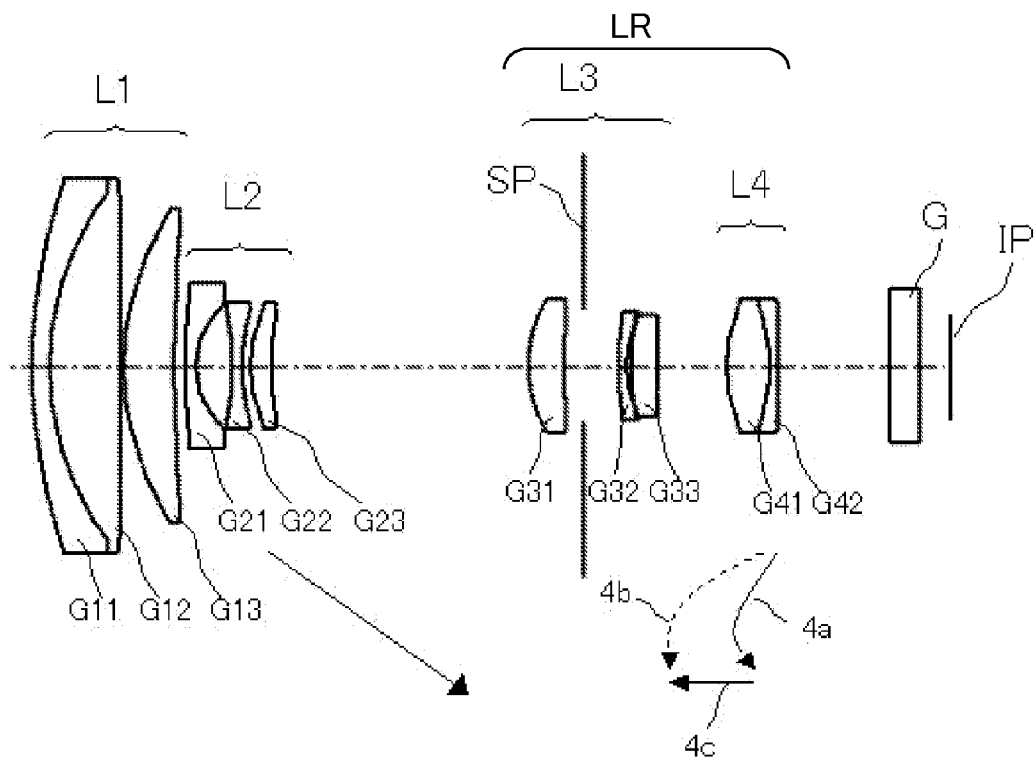
FIG. 13 is a sectional view of a zoom lens that is a fourth embodiment (Embodiment 4) of the present invention at a wide-angle end.
Figure 14:
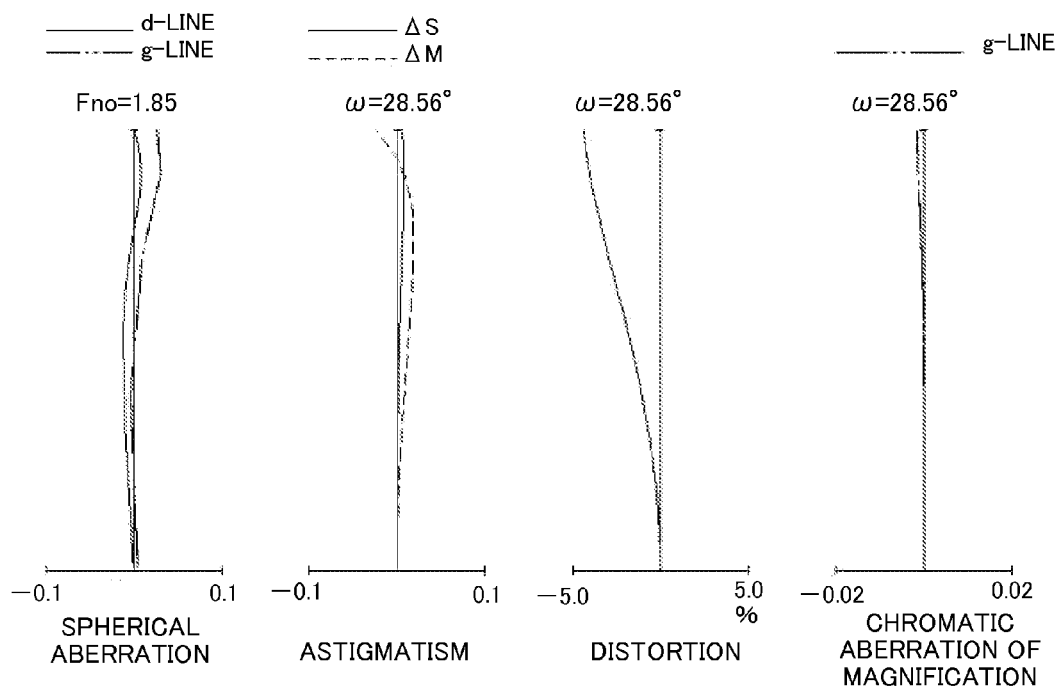
FIG. 14 is an aberration diagram of a numerical example of Embodiment 4 at the wide-angle end.
Figure 15:
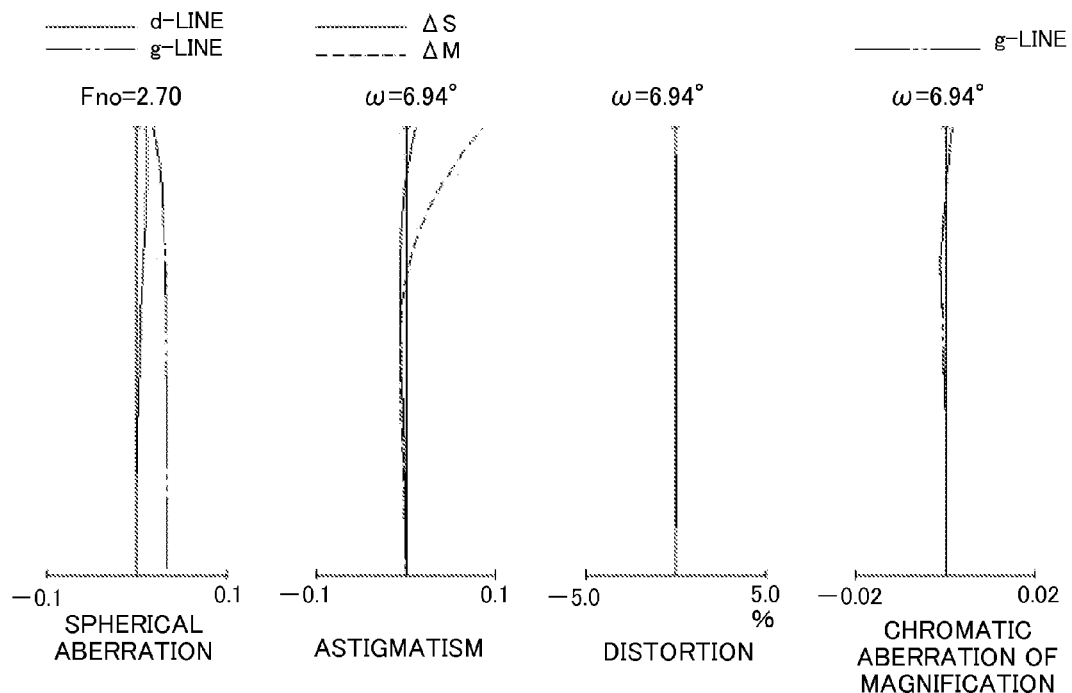
FIG. 15 is an aberration diagram of the numerical example of Embodiment 4 at a middle zoom position.
Figure 16:
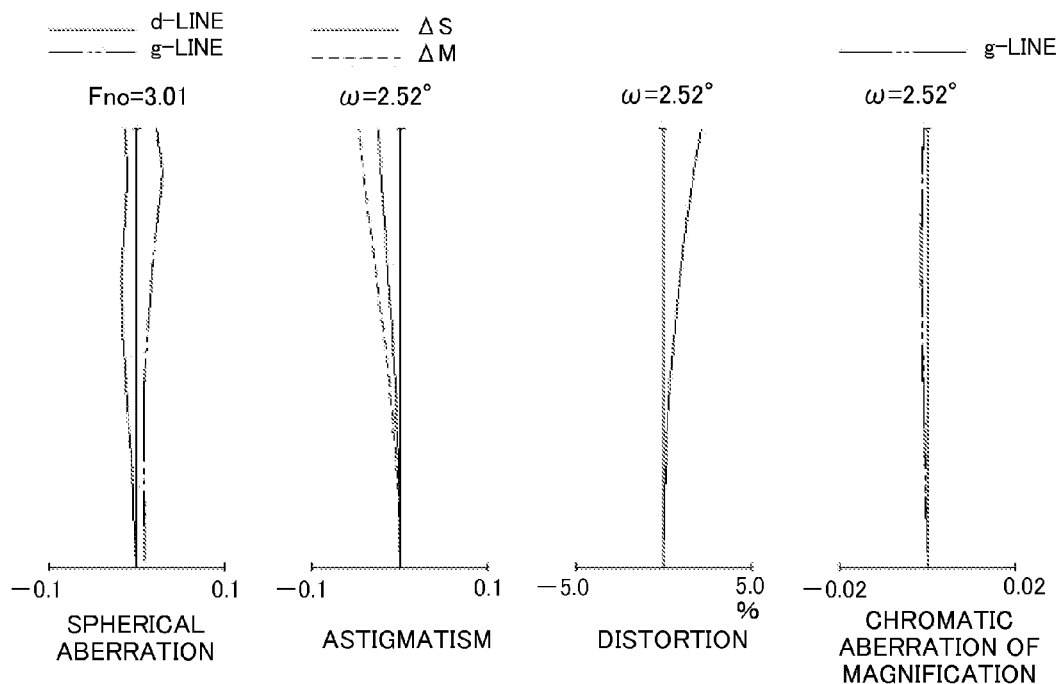
FIG. 16 is an aberration diagram of the numerical example of Embodiment 4 at a telephoto end.

FIG. 13 is a main-portion sectional view of a zoom lens of a fourth embodiment (Embodiment 4) at a wide-angle end. FIGS. 14 to 16 are aberration diagrams respectively at the wide-angle end, a middle zoom position, and a telephoto end of the zoom lens of a numerical example corresponding to Embodiment 4.

Figure 17:
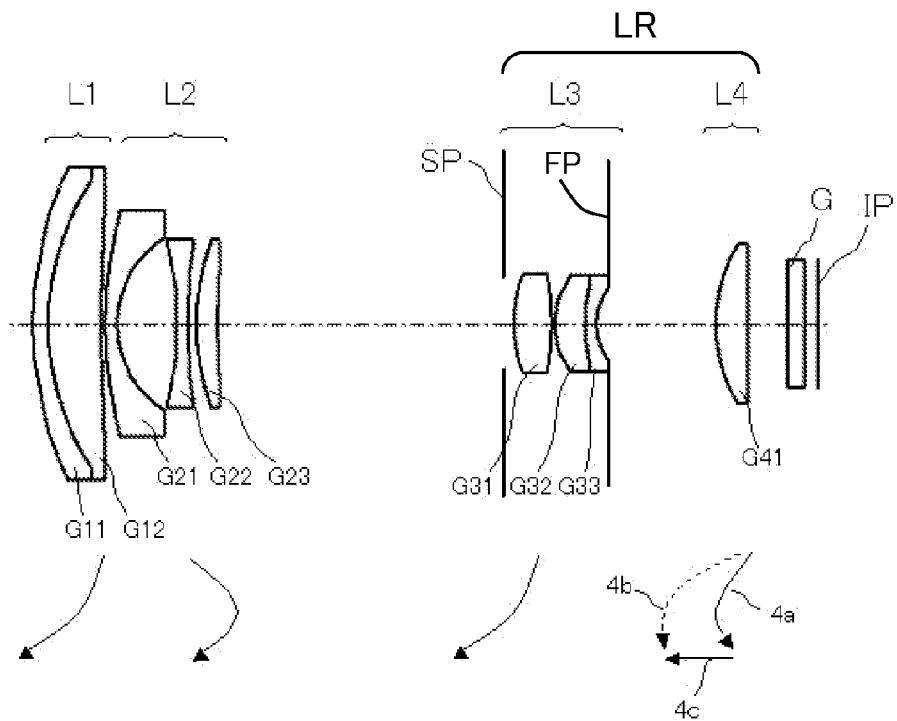
FIG. 17 is a sectional view of a zoom lens that is a fifth embodiment (Embodiment 5) of the present invention at a wide-angle end.
Figure 18:
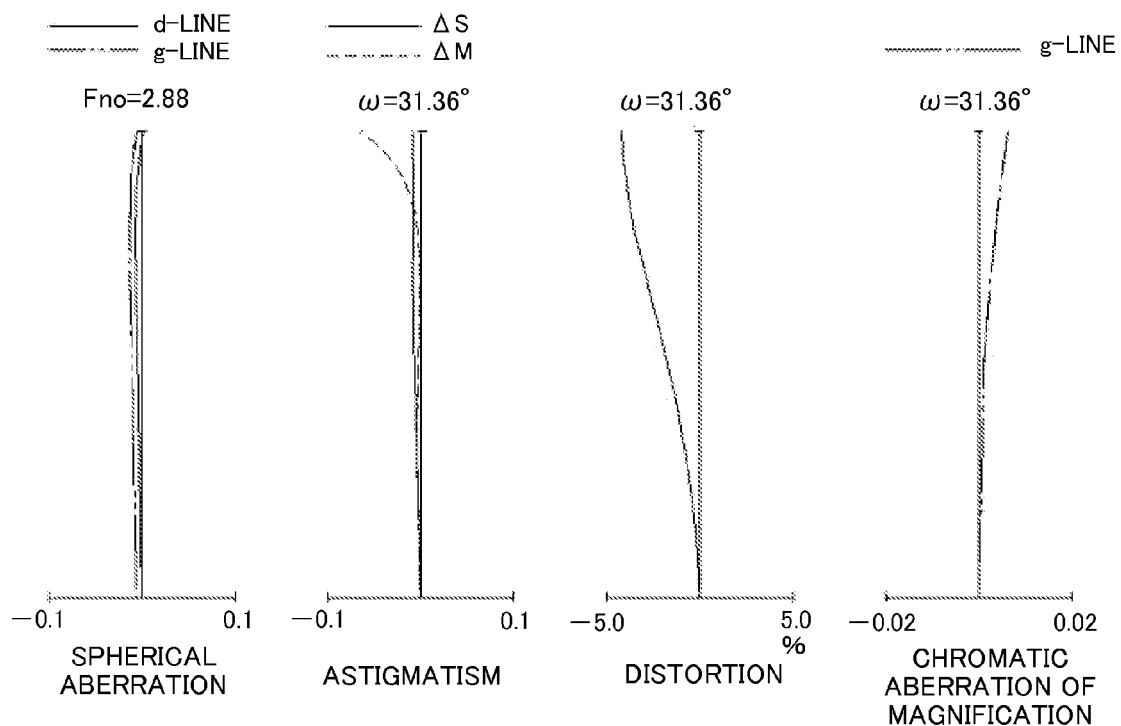
FIG. 18 is an aberration diagram of a numerical example of Embodiment 5 at the wide-angle end.
Figure 19:
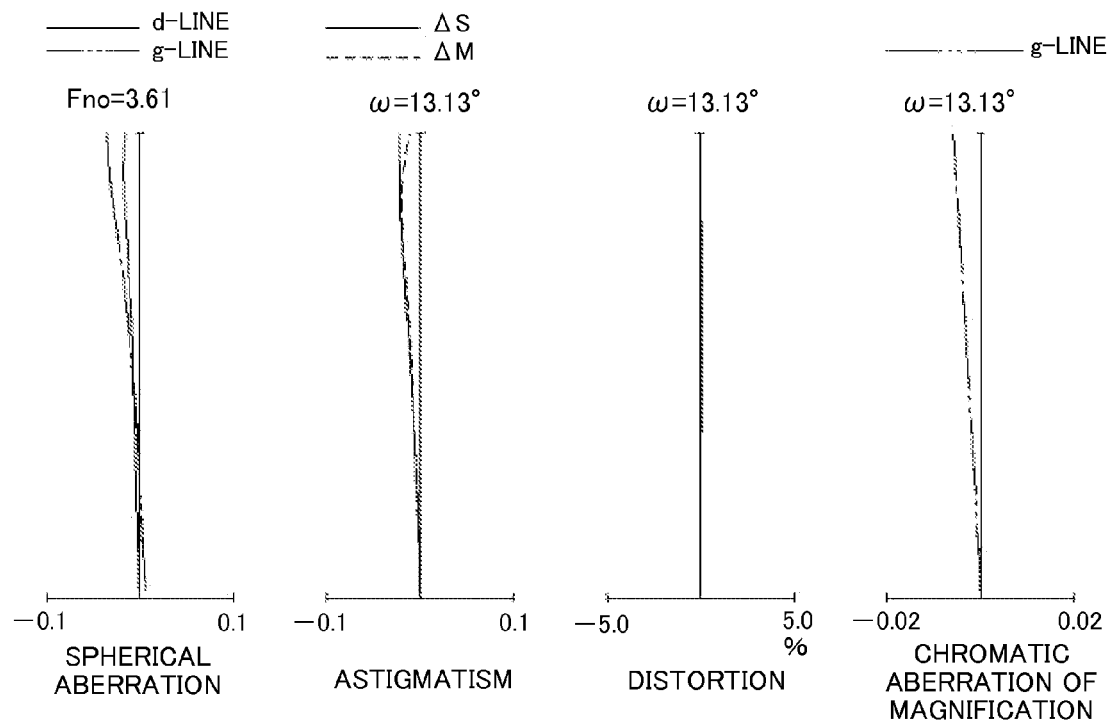
FIG. 19 is an aberration diagram of the numerical example of Embodiment 5 at a middle zoom position.
Figure 20:
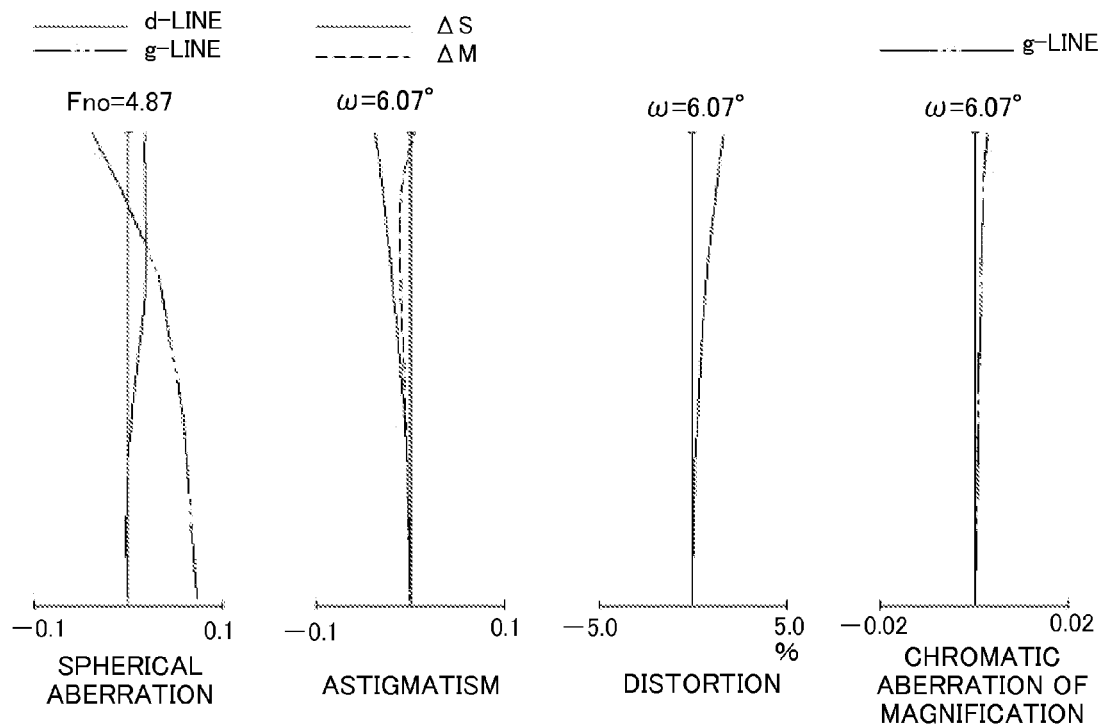
FIG. 20 is an aberration diagram of the numerical example of Embodiment 5 at a telephoto end.

FIG. 17 is a main-portion sectional view of a zoom lens of a fifth embodiment (Embodiment 5) at a wide-angle end. FIGS. 18 to 20 are aberration diagrams respectively at the wide-angle end, a middle zoom position, and a telephoto end of the zoom lens of a numerical example corresponding to Embodiment 5.

Figure 21:
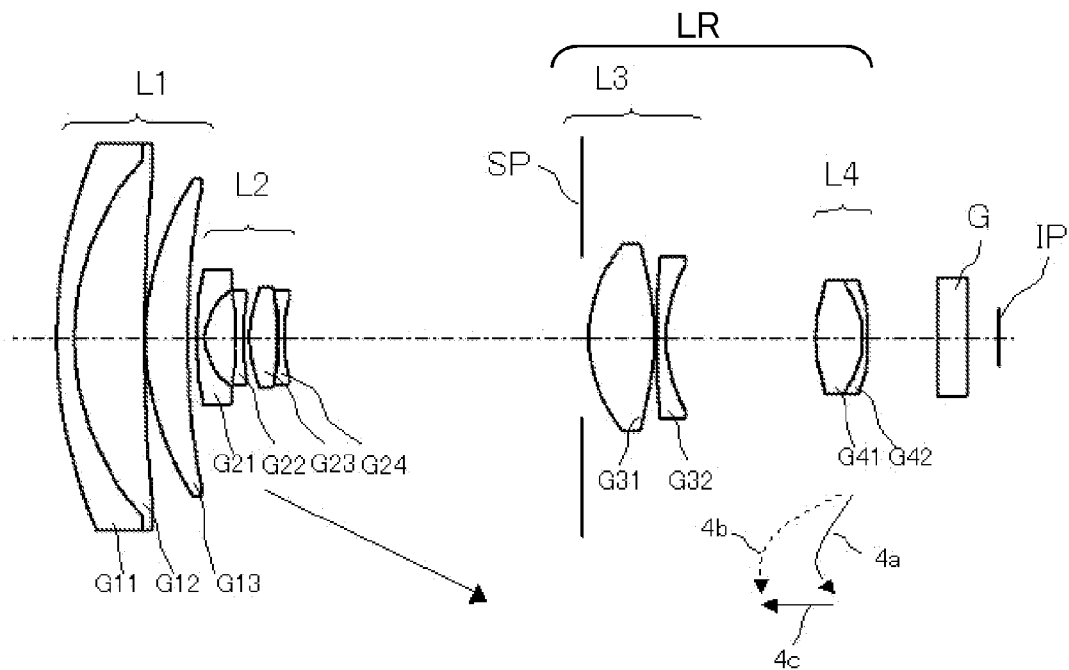
FIG. 21 is a sectional of a zoom lens of a sixth embodiment (Embodiment 6) of the present invention at a wide-angle end.
Figure 22:
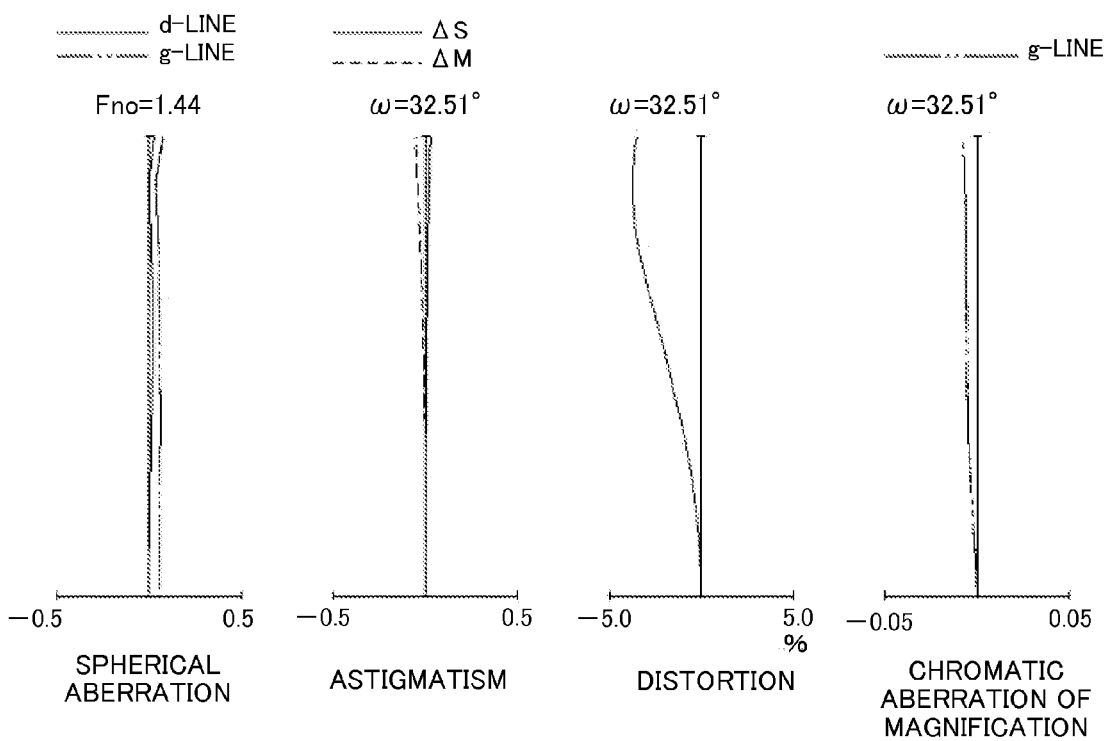
FIG. 22 is an aberration diagram of a numerical example of Embodiment 6 at the wide-angle end.
Figure 23:
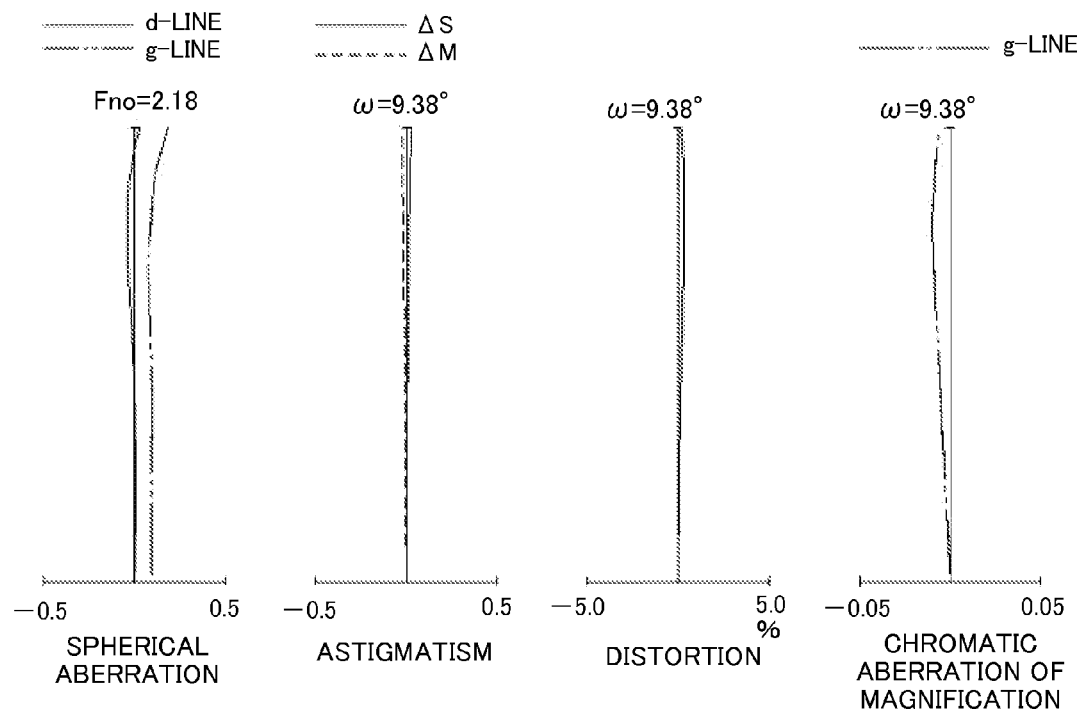
FIG. 23 is an aberration diagram of the numerical example of Embodiment 6 at a middle zoom position.
Figure 24:
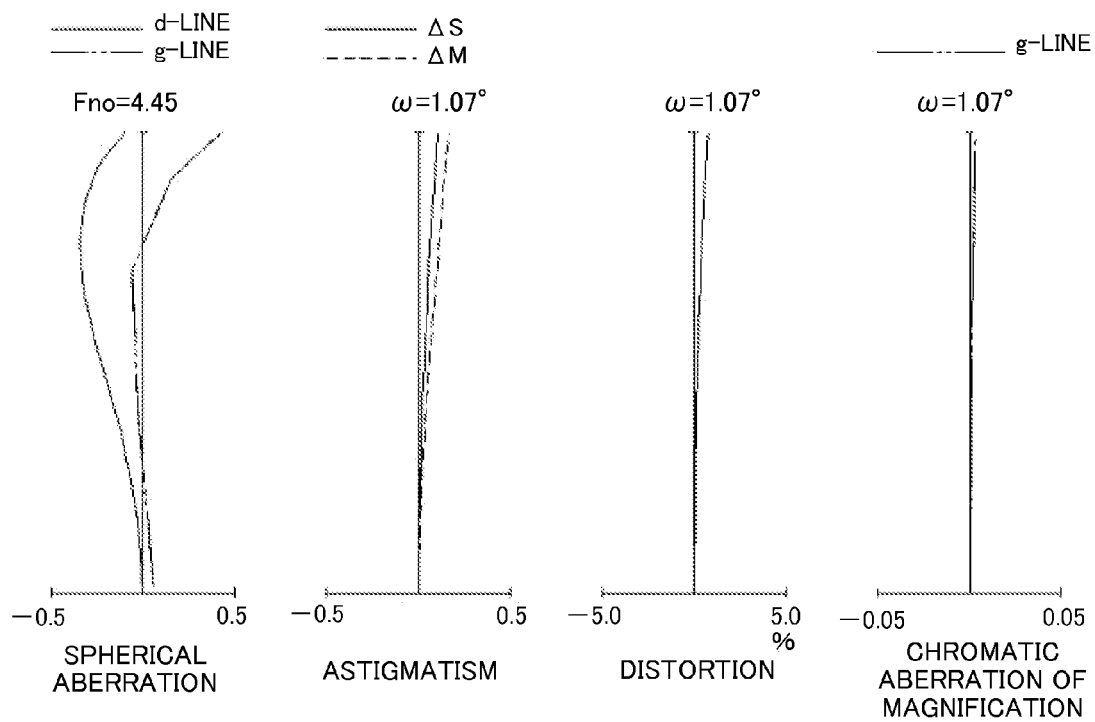
FIG. 24 is an aberration diagram of the numerical example of Embodiment 6 at a telephoto end.

FIG. 21 is a main-portion sectional view of a zoom lens of a sixth embodiment (Embodiment 6) at a wide-angle end. FIGS. 22 to 24 are aberration diagrams respectively at the wide-angle end, a middle zoom position, and a telephoto end of the zoom lens of a numerical example corresponding to Embodiment 6.

Figure 25:
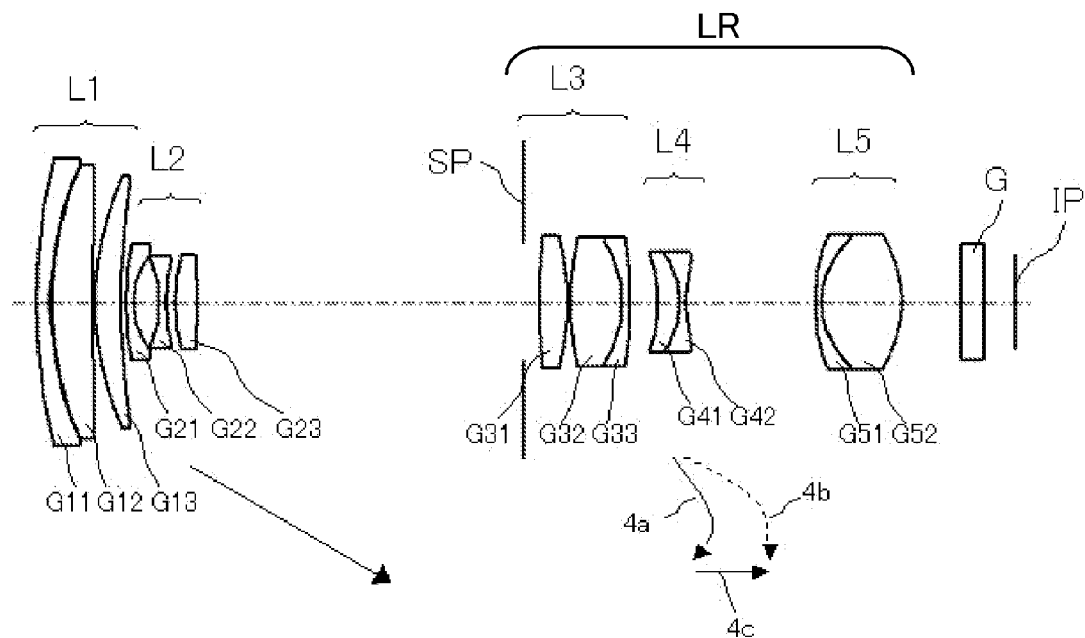
FIG. 25 is a sectional view of a zoom lens that is a seventh embodiment (Embodiment 7) of the present invention at a wide-angle end.
Figure 26:
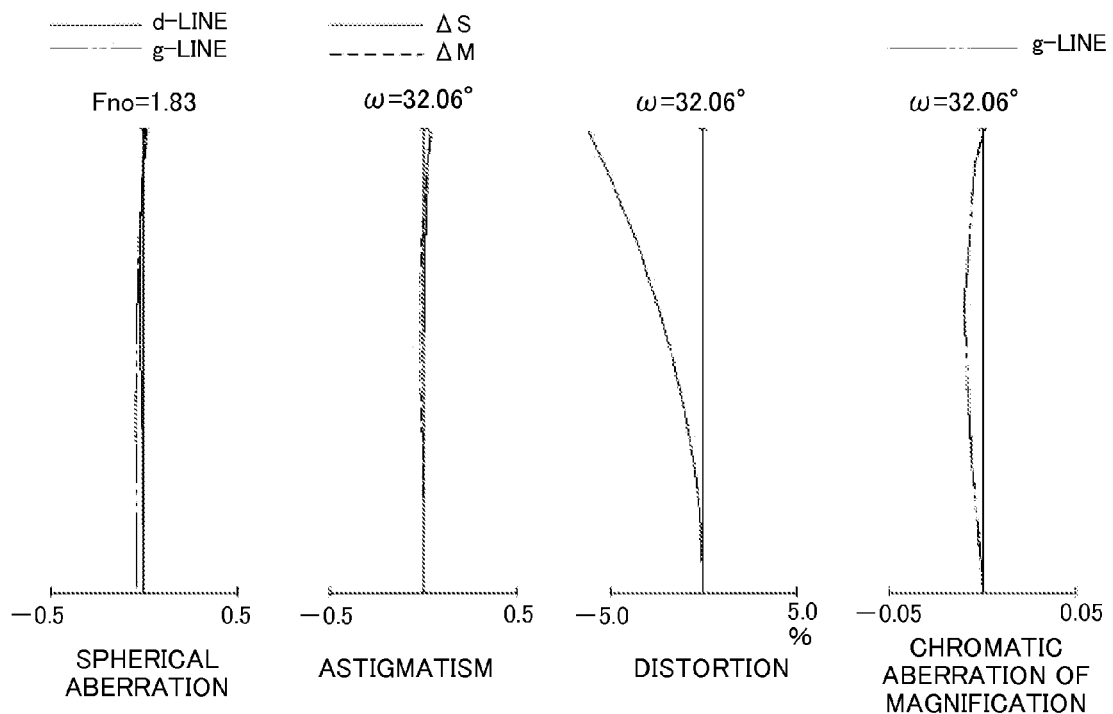
FIG. 26 is an aberration diagram of a numerical example of Embodiment 7 at the wide-angle end.
Figure 27:
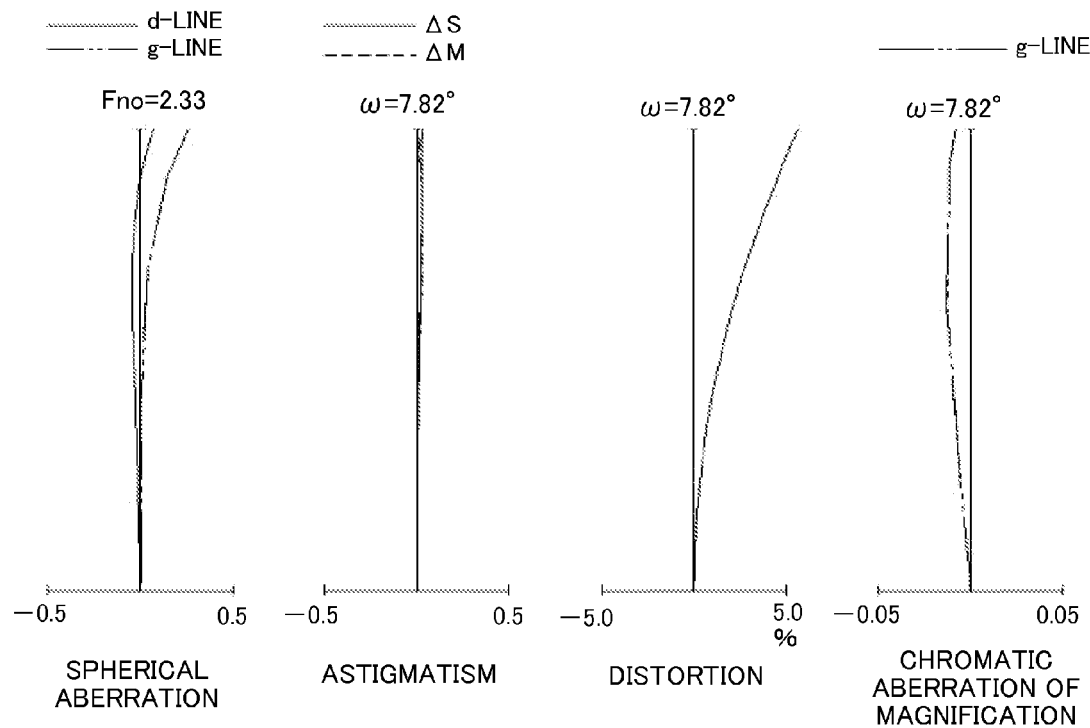
FIG. 27 is an aberration diagram of the numerical example of Embodiment 7 at a middle zoom position.
Figure 28:
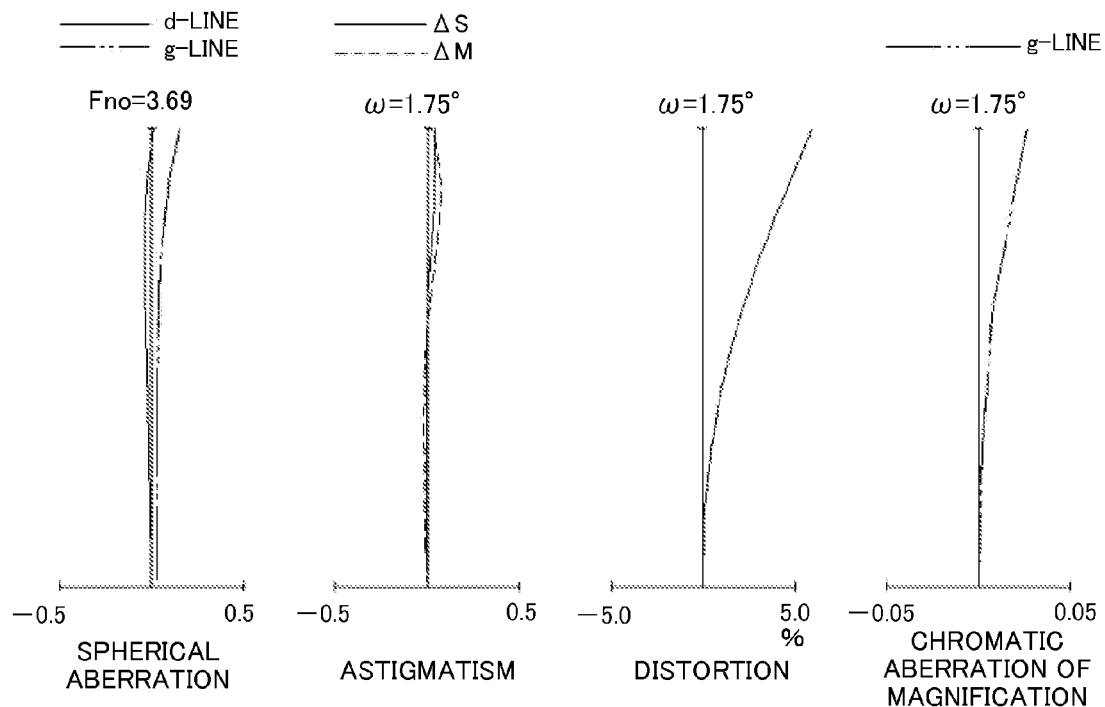
FIG. 28 is an aberration diagram of the numerical example of Embodiment 7 at a telephoto end.

FIG. 25 is a main-portion sectional view of a zoom lens of a seventh embodiment (Embodiment 7) at a wide-angle end. FIGS. 26 to 28 are aberration diagrams respectively at the wide-angle end, a middle zoom position, and a telephoto end of the zoom lens of a numerical example corresponding to Embodiment 7.

The zoom lens of each embodiment is an image-pickup lens system used for an image-pickup apparatus such as a video camera and a digital camera. In the lens sectional view, a left side is an object side (front), and a right side is an image side (rear).

When the zoom lens of each embodiment is used as a projection lens of a projector, the left side is a screen side, and the right side is an image projection side.

In the lens sectional view, reference character i denotes the order of lens units from the object side, and reference character Li denotes a first lens unit. Reference character LR denotes a rear unit which includes at least one lens unit.

Reference character SP denotes an aperture stop. In each of the zoom lenses of Embodiments 2, 3, and 5 to 7 shown in FIGS. 5, 9, 17, 21 and 25, the aperture stop SP is disposed closer to an object than a third lens unit L3.

In each of the zoom lenses of Embodiments 1 and 4 shown in FIGS. 1 and 13, the aperture stop SP is disposed in the third lens unit L3.

In FIGS. 9 and 17, reference character FP denotes a flare-cutting stop disposed closer to an image than the third lens unit L3.

Reference character G denotes an optical block including an optical filter, a face plate, a crystal low-pass filter, or an infrared-cutting filter.

Reference character IP denotes an image plane (image surface). In use as an image-pickup system of a video camera or a digital still camera, an image-pickup plane of a solid-state image-pickup element (photoelectric conversion element) such as a CCD sensor or a CMOS sensor is placed at the image plane. In use as an image-pickup optical system of a camera for a silver-haloid film, a film plane is placed at the image plane.

In the aberration diagram, d-LINE and g-LINE respectively represent a d-line and g-line. ΔM and ΔS respectively represent a meridional image surface and a sagittal image surface. Chromatic aberration of magnification is represented by the g-line. Reference characters ω and Fno respectively denote a half-field angle and an F-number.

In each embodiment below, the wide-angle end and the telephoto end mean zoom positions where a magnification-varying lens unit(s) mechanically reaches both ends of its movable range on an optical axis of the zoom lens.

Arrows indicate movement tracks of respective lens units in zooming from the wide-angle end to the telephoto end.

The zoom lens of each embodiment includes, in order from the object side to the image side, a first lens unit L1 having a positive refractive power, a second lens unit L2 having a negative refractive power, and a rear unit LR which is closer to the image than the second lens unit L2 and includes at least one lens unit.

During zooming from the wide-angle end to the telephoto end, the second lens unit L2 is moved such that a distance between the first and second lens unit L1 and L2 is larger at the telephoto end than at the wide-angle end.

In each of the zoom lenses of Embodiments 1 to 6, the rear unit LR includes the third lens unit L3 having a positive refractive power and a fourth lens unit L4 having a positive refractive power.

In each of the zoom lenses of Embodiments 1, 2, 4, and 6, in zooming from the wide-angle end to the telephoto end, the second lens unit L2 is moved to the image side to mainly perform variation of magnification. The fourth lens unit L4 is moved to correct variation of the image plane accompanying the variation of magnification, and to perform focusing.

The movement track of the fourth lens unit L4 during zooming is convexed toward the object to make effective use of a space between the third and fourth lens units L3 and L4, thereby effectively reducing the entire lens length.

A solid curved line 4a and a dotted curved line 4b regarding the fourth lens unit L4 indicate movement tracks to correct variation of the image plane accompanying the variation of magnification when the zoom lens is focused on an infinite object and a near object.

To perform focusing from the infinite object to the near object at the telephoto end, the fourth lens unit L4 is moved forward as indicated by an arrow 4c.

The first and third lens units L1 and L3 and the aperture stop SP are not moved in an optical axis direction for zooming or focusing. However, they may be moved when necessary for aberration correction.

In the zoom lenses of Embodiments 3 and 5, each lens unit is moved to perform zooming. During zooming from the wide-angle end to the telephoto end, the second lens unit L2 is moved so as to draw a movement track convex toward the image. The first and third lens unit L1 and L3 are moved to be located closer to the object at the telephoto end than at the wide-angle end.

The fourth lens unit L4 is moved so as to draw a movement track convex toward the object during zooming.

During zooming, the first lens unit L1 is moved closer to the object at the telephoto end than at the wide-angle end, thereby obtaining a high zoom ratio while reducing the total lens length at the wide-angle end.

During zooming, the third lens unit L3 is moved to be located closer to the object at the telephoto end than at the wide-angle end, whereby the third lens unit L3 provides a larger magnification varying effect.

During zooming from the wide-angle end to the telephoto end, the first lens unit L1 having a positive refractive power is moved closer to the object, thereby providing a magnification varying effect to the second lens unit L2. Thus, a high zoom ratio is obtained without increasing refractive powers of the first and second lens units L1 and L2.

The zoom lenses of Embodiments 3 and 5 employ a rear-focus system which performs focusing by moving the fourth lens unit L4 on the optical axis.

The movement track of the fourth lens unit L4 for focusing is similar to that of each in Embodiments 1, 2, 4, and 6.

The aperture stop SP is moved integrally with the third lens unit L3 during zooming. However, the aperture stop SP may be moved separately from the third lens unit L3, or fixed. The integral movement simplifies a mechanical structure of the zoom lens.

The movement of the aperture stop SP separately from the third lens unit L3 is advantageous for miniaturizing the first lens unit L1.

On the other hand, fixing of the aperture stop SP is advantageous for saving power because driving torque of an actuator driving the third lens unit L3 during zooming can be set small.

The flare-cutting stop FP is moved integrally with the third lens unit L3 during zooming.

In the zoom lens of Embodiment 7, the rear unit LR includes a third lens unit L3 having a positive refractive power, a fourth lens unit L4 having a negative refractive power, and a fifth lens unit L5 having a positive refractive power.

During zooming from the wide-angle end to the telephoto end, the second lens unit L2 is moved to the object side to mainly perform variation of magnification. The fourth lens unit L4 is moved to correct variation of the image plane accompanying the variation of magnification.

The movement track of the fourth lens unit L4 is convexed toward the image to make effective use of a space between the fourth and fifth lens units L4 and L5, thereby effectively reducing the entire lens length.

To perform focusing from the infinite object to the near object at the telephoto end, the fourth lens unit L4 is moved rearward (to the image side) as indicated by an arrow 4c.

A solid curved line 4a and a dotted curved line 4b regarding the fourth lens unit L4 indicate movement tracks to correct variation of the image plane accompanying the variation of magnification from the wide-angle end to the telephoto end when the zoom lens is focused on an infinite object and a near object.

Focusing from the infinite object to the near object may be performed by moving the fifth lens unit L5 toward the object.

The movement track of the fifth lens unit L5 for focusing is similar to that of the fourth lens unit L4 in Embodiments 1 to 6.

The first and third lens units L1 and L3 and the aperture stop SP are not moved on the optical axis direction for zooming or focusing. However, they may be moved when necessary for aberration correction.

Each embodiment shows the zoom lens which includes four or five lens units. However, the zoom lens may include a lens unit or converter lens unit having a refractive power on the object side of the first lens unit L1 as occasion demands.

The zoom lens may include the lens unit or converter lens unit having a refractive power on the image side of the fourth lens unit L4 of each of Embodiments 1 to 4 or on the image side of the fifth lens unit L5 of Embodiment 7.

In each embodiment, Nd1a denotes a refractive index for the d-line, and vd1a denotes an Abbe number for the d-line.

In this case, the first lens unit L1 includes at least one lens element (first lens element) G1a made of a material which satisfies the following conditions:

$$Nd1a > 2.3 - 0.01 \cdot vd1a \quad (1)$$

$$1.65 < Nd1a < 2.70 \quad (2)$$

Technical meanings of the conditional expressions (1) and (2) will be described below.

The conditional expressions (1) and (2) define a relationship between the refractive index Nd1a and the Abbe number vd1a of the material of the one lens element G1a constituting the first lens unit L1.

The conditional expression (1) indicate that, when the Abbe number vd1a of the material of the lens element G1a is decided, the refractive index Nd1a of the material should be larger than a value calculated by the right side of the conditional expression (1).

The conditional expression (1) means that, to reduce the Abbe number vd1a of the material of the lens element G1a, in other words, to increase dispersion thereof, the refractive index Nd1a of the material should be larger.

When the refractive index Nd1a is lower than the lower limit of the conditional expression (1) calculated from the Abbe number, a curvature of each surface of the lens element G1a is increased. As a result, spherical and longitudinal chromatic aberrations generated in the lens element G1a become too large, so that residual spherical and longitudinal chromatic aberrations become large in the first lens unit L1.

The amount of aberration generated in the first lens unit L1 becomes an aberration value obtained by multiplying a product of lateral magnifications of the second lens unit L2 and others closer to the image than the second lens unit L2 in the entire lens system.

In the zoom lens, a product of the lateral magnifications of the second lens unit L2 and others closer to the image than the second lens unit L2 becomes maximum at the telephoto end.

Thus, when the residual spherical and longitudinal chromatic aberrations of the first lens unit Li are large, particularly in the zoom lens of a high zoom ratio, the amount of the aberrations are large at the telephoto end in the entire lens system. Consequently, flare is increased, resolution is reduced, and color blur is increased, thereby deteriorating image quality.

When the refractive index Nd1a of the material of the lens element G1a is lower than the lower limit of the conditional expression (2), a curvature of the lens element G1a is increased. As a result, spherical aberration generated in the lens element G1a becomes too large, and therefore flare is increased and resolution is reduced particularly at the telephoto end.

Further, when the refractive index Nd1a of the material of the lens element G1a is higher than the upper limit of the conditional expression (2), the refractive index Nd1a is too large. This makes correction of Petzval sum of the entire lens system difficult and generates field curvature.

In each embodiment, satisfying the conditional expressions (1) and (2) can provide a compact zoom lens having a high zoom ratio and high optical performance.

In each embodiment, it is more preferable that at least one of the following conditions be satisfied in addition to the conditional expressions (1) and (2). Thus, effects corresponding to the conditions can be obtained.

When the lens element G1a has a positive refractive power, the lens element G1a is referred to as a positive lens element G1pa. In this case, vd1pa denotes an Abbe number of a material of the positive lens element G1pa, R1p denotes a curvature radius of an object side surface thereof, and R2p denotes a curvature radius of an image side surface thereof.

f1pa denotes a focal length of the positive lens element G1pa and f1 denotes a focal length of the first lens unit.

When the lens element G1a has a negative refractive power, the lens element G1a is referred to as a negative lens element G1na. In this case, vd1na denotes an Abbe number of a material of the negative lens element G1na, R1n denotes a curvature radius of an object side surface thereof, and R2n denotes a curvature radius of an image side surface thereof.

f1na denotes a focal length of the negative lens element G1na, and f2 denotes a focal length of the second lens unit.

In this case, it is preferable that at least one of the following conditions be satisfied. Especially, it is more preferable that the conditional expression (9) be satisfied.

$$vd1pa > 45 \quad (3)$$

$$0.5 < (R1p+R2p)/(R2p-R1p) < 10.0 \quad (4)$$

$$0.3 < f1pa/f1 < 3.0 \quad (5)$$

$$vd1na < 45 \quad (6)$$

$$-10.0 < (R1n+R2n)/(R2n-R1n) < -1.5 \quad (7)$$

$$1.0 < |f1na/f1| < 3.0 \quad (8)$$

$$2.5 < |f1/f2| < 12.0 \quad (9)$$

Technical meanings of the conditional expressions (3) to (9) will be described below.

The conditional expressions (3) and (4) define the Abbe number of the material of the lens element G1a and a lens shape thereof when the lens element G1a is a positive lens element G1pa having a positive refractive power.

When the Abbe number vd1a is lower than the lower limit of the conditional expression (3), longitudinal chromatic aberration generated in the positive lens element G1pa becomes excessively large. Even if achromatizing is carried out by a combination with the negative lens element in the first lens unit L1, correction of a secondary spectrum of the longitudinal chromatic aberration is difficult at the telephoto end.

The conditional expression (4) relates to a shape factor (lens shape) of the positive lens element G1pa.

When the value of the conditional expression (4) is lower than the lower limit thereof because, in the positive lens element G1pa which is a biconvex lens element, a curvature of its image side surface is too large, an emergent angle of off-axis rays from the image side surface of the positive lens element G1pa becomes excessively large at the wide-angle end, disadvantageously generating a large chromatic aberration of magnification and a large astigmatism at the wide-angle end.

When the value of the conditional expression (4) is higher than the upper limit thereof because a difference between the curvature radiuses R1p and R2p of the positive lens element G1pa is too small, the refractive power of the positive lens element G1pa is reduced, resulting in a difficulty of providing an adequate aberration correction capability to the positive lens element G1pa.

Thus, characteristics of the material of the positive lens element G1pa, in other words, a lower dispersion and a higher refractive index than those of general glass materials cannot be effectively used, resulting in a difficulty of achieving increase of the magnification (zoom) ratio and miniaturization of the entire lens system.

From another viewpoint, when the value of the conditional expression (4) is higher than the upper limit thereof because the difference between the curvature radiuses R1p and R2p of the positive lens element G1pa is too small, providing an adequate refractive power to the positive lens element G1pa excessively reduces the curvature radius R1p of the positive lens element G1pa.

In this case, a refractive power of the convex object side surface becomes too large, and therefore an incident angle of axial rays whose height is large at the telephoto end in the first lens unit L1 is increased. This generates a large spherical aberration, deteriorating optical performance at the telephoto end.

The conditional expression (5) defines a refractive power distribution of the positive lens element G1pa in the first lens unit L1.

When the value of the conditional expression (5) is lower than the lower limit thereof because the focal length of the positive lens element G1pa is too small, in other words, the refractive power thereof is too large, spherical and longitudinal chromatic aberrations generated in the positive lens element G1pa at the telephoto end are too large. This makes correction of the aberrations by another lens element(s) of the first lens unit L1 difficult.

When the value of the conditional expression (5) is higher than the upper limit thereof because the refractive power of the positive lens element G1pa is excessively reduced, the characteristics of the material of the positive lens element G1pa in which the dispersion is lower and the refractive index is higher as compared with those of general glass materials cannot be effectively used, resulting in a difficulty of achieving increase of the zoom ratio and miniaturization of the entire lens system.

The conditional expressions (6) to (8) is employed when the lens element G1a is a negative lens element G1na having a negative refractive power.

The conditional expressions (6) to (8) define the Abbe number of the material and a lens shape of the negative lens element G1na.

In the first lens unit L1 having a positive refractive power, a combination of the negative lens element G1na with the positive lens element provides an achromatizing effect.

When the Abbe number vd1na is larger than the upper limit of the conditional expression (6), a difference of the Abbe number of the negative lens element G1na from that of the positive lens element is small, and therefore sufficient achromatizing cannot be performed. This causes a correction shortage of the longitudinal chromatic aberration at the telephoto end.

The conditional expression (7) relates to a shape factor of the negative lens element G1na.

Within the range of the conditional expression (7), the negative lens element G1na has a meniscus shape where its image side surface is a concave surface having a strong curvature.

When the value of the conditional expression (7) is lower than the lower limit thereof because the curvature radius R2n of the image side surface of the negative lens element G1na is too small, in other words, the curvature thereof is too strong, an incident angle of axial rays whose height is large at the telephoto end in the first lens unit L1 is too large.

Consequently, at the telephoto end, a large spherical aberration is generated on the image side surface of the negative lens element G1na. Such a large spherical aberration cannot be sufficiently corrected by the positive lens element of the first lens unit, causing deterioration of optical performance at the telephoto end.

When the value of the conditional expression (7) is higher than the upper limit thereof because a difference between the curvature radiuses R1n and R2n of the negative lens element G1na is too small, the refractive power of the negative lens element G1na is reduced, causing a difficulty of providing an adequate aberration correction capability to the negative lens element G1na.

Consequently, characteristics of the material of the negative lens element G1na, in other words, a lower dispersion and a higher refractive index than those of general glass materials cannot be effectively used, resulting in a difficulty of achieving increase of the zoom ratio and miniaturization of the entire lens system.

The conditional expression (8) defines an appropriate refractive power of the negative lens element G1na for the purpose of performing achromatizing in combination with the positive lens element in the first lens unit L1 having a positive refractive power.

When the value of the conditional expression (8) is lower than the lower limit thereof because the focal length f1na of the negative lens element G1na is too small, in other words, the refractive power of the negative lens element G1na is too large, the correction amount for longitudinal chromatic aberration generated in the negative lens element G1na is too large, causing a difficulty of performing good achromatizing.

On the other hand, when the value of the conditional expression (8) is higher than the upper limit thereof because the focal length f1na of the negative lens element G1na is too large, in other words, the refractive power of the negative lens element G1na is too small, the correction amount for the longitudinal chromatic aberration generated in the negative lens element G1na is short, causing a difficulty of performing good achromatizing.

The conditional expression (9) defines a ratio of refractive powers between the first and second lens units L1 and L2.

When the value of the conditional expression (9) is lower than the lower limit thereof because the focal length f1 of the first lens unit L1 is too small, sufficient correction of spherical and longitudinal chromatic aberrations generated in the first lens unit L1 is difficult. Even when a material which satisfies at least one of the conditional expressions (1) to (8) is used, aberration correction is difficult.

When the value of the conditional expression (9) is higher than the upper limit thereof because the focal length f1 of the first lens unit L1 is too large, an image-forming position of the first lens unit L1 is far away from the first lens unit L1 toward the image.

This is not good, because the movement amount of the second lens unit L2 or the rear unit LR has to be increased to obtain a high zoom ratio, consequently enlarging the entire lens system.

In each embodiment, more preferably, the numerical ranges of the conditional expressions (2) to (9) are set as follows:

$$1.7 < Nd1a < 2.65 \quad (2a)$$

$$vd1pa > 48 \quad (3a)$$

$$0.6 < (R1p+R2p)/(R2p-R1p) < 7.0 \quad (4a)$$

$$0.4 < f1pa/f1 < 2.4 \quad (5a)$$

$$vd1na < 42 \quad (6a)$$

$$-8.0 < (R1n+R2n)/(R2n-R1n) < -2.0 \quad (7a)$$

$$1.1 < |f1na/f1| < 2.5 \quad (8a)$$

$$3.0 < |f1/f2| < 10.0 \quad (9a)$$

Still more preferably, the numerical ranges of the conditional expressions (2a) to (9a) are set as follows:

$$1.7 < Nd1a < 2.6 \quad (2b)$$

$$vd1pa < f1pa/f1 < 1.8 \quad (3b)$$

$$0.7 < (R1p+R2p)/(R2n-R1p) < 5.0 \quad (4b)$$

$$0.45 < f1pa/f1 < 1.8 \quad (5b)$$

$$vd1na < 40 \quad (6b)$$

$$-6.5 < (R1n+R2n)/(R2n-R1n) < -2.5 \quad (7b)$$

$$1.2 < |f1na/f1| < 2.0 \quad (8b)$$

$$3.5 < |f1/f2| < 9.0 \quad (9b)$$

Satisfying each of the conditional expressions (2b) to (9b) can obtain the maximal effect described above.

It is preferable that the second lens unit L2 include at least one positive lens element and at least one negative lens element.

This configuration of the second lens unit L2 moved during zooming facilitates suppression of variation of chromatic aberration of magnification accompanying the zooming.

Among the lens units constituting the rear unit LR closer to the image than the second lens unit L2, the lens unit closest to the object preferably has a positive refractive power.

At the wide-angle end, axial rays are dispersed after passage through the second lens unit L2 having a negative refractive power. However, the positive refractive power of the lens unit closest to the object constituting the rear unit closer to the image than the second lens unit L2 provides a converging effect to the axial rays, thereby reducing a lens effective diameter of the rear unit.

Thus, the above configuration of the second lens unit L2 is advantageous for miniaturizing the zoom lens.

Further, the number of the positive lens element(s) included in the first lens unit L1 is preferably two or less for the purpose of miniaturizing the entire lens system.

Thus, according to each embodiment, effective use of the material different in optical characteristics from general optical glasses for the first lens unit can realize a compact zoom lens having a high zoom ratio and being capable of obtaining high optical performance over the entire zoom range.

Next, a specific lens configuration of each embodiment will be described. Hereinafter, the lens units or the lens elements are disposed in order from the object side to the image side unless otherwise noted.

The zoom lens of Embodiment 1 shown in FIG. 1 includes a first lens unit L1 having a positive refractive power, a second lens unit L2 having a negative refractive power, a third lens unit L3 having a positive refractive power, and a fourth lens unit L4 having a positive refractive power.

During zooming from the wide-angle end to the telephoto end, the second lens unit L2 is moved toward the image to mainly perform variation of magnification, and the fourth lens unit L4 is moved along a movement track convex toward the object to mainly correct variation of an image plane accompanying the variation of magnification.

The first lens unit L1 includes a cemented lens element formed by cementing a negative lens element G11 having a meniscus shape and a convex object side surface with a positive lens element G12, and a positive lens element G13 having a meniscus shape and a convex object side surface.

The three-lens element configuration of the first lens unit can perform good correction of spherical aberration and good correction of longitudinal chromatic aberration and chromatic aberration of magnification in each color even in the zoom lens having a high zoom ratio.

The positive lens element G12 corresponds to the positive lens element G1*pa*. The positive lens element G12 uses a material where a refractive index and an Abbe number satisfy the conditional expressions (1) and (2), such as yttrium aluminum garnet ceramics.

The yttrium aluminum garnet is called "YAG", which is a transparent oxide in a visible light area and represented by Y3Al5O12.

The material has optical characteristics that its refractive index is 1.83 and its Abbe number is 59, and is characterized by being present within a region where no general optical glass materials are present in the nd-vd diagram, the region being located on the left above a region where the general optical glass materials are present in that diagram.

In other words, the material has a lower dispersion than that of an optical glass material having a refractive index equal to that of the material.

In the zoom lens of the embodiment which includes the first lens unit L1 having a positive refractive power and being fixed during zooming and the second lens unit L2 having a negative refractive power and being moved for variation of magnification, providing a high refractive power to the first lens unit L1 is effective for miniaturizing the entire lens system.

To provide a high refractive power to the first lens unit L1, the curvature of a surface of the positive lens element in the first lens unit L1 has to be set strong or the refractive index of the material thereof has to be increased.

When the curvature of the surface of the positive lens element is increased, large spherical and longitudinal chromatic aberrations are generated in the positive lens element. Especially, at the telephoto end where the height of the axial rays is large in the first lens unit L1, the spherical and longitudinal chromatic aberration are large, causing a difficulty of achieving a high zoom ratio while maintaining high optical performance.

On the other hand, use of a material having a high refractive index for the positive lens element reduces the curvature of its image side surface, enabling suppression of the occurrence of spherical aberration.

However, in the general optical glass materials, the Abbe number reduces, in other words, the dispersion increases as the refractive index increases. Accordingly, chromatic aberration generated in the positive lens element increases, and thereby longitudinal chromatic aberration generated at the telephoto end increases.

Thus, in the general optical glass materials, there is a limit to simultaneous achievement of a high zoom ratio and miniaturization of the entire lens system while maintaining high optical performance.

On the other hand, use of a material having a higher refractive index and a larger Abbe number than those of the general optical glass materials for the positive lens element of the first lens unit L1 facilitates correction of both of spherical and longitudinal chromatic aberrations at the telephoto end. Thus, miniaturization of the entire lens system and a high zoom ratio can simultaneously be realized easily.

According to the embodiment, the YAG ceramics having optical characteristics different from those of the general optical glass materials is used as the material for the positive lens element G12 of the first lens unit L1. Thus, spherical and longitudinal chromatic aberrations are corrected well at the telephoto end to simultaneously achieve a high zoom ratio of about 10 and miniaturization of the entire lens system.

The YAG has optical characteristics similar to those of ceramics even in a monocrystal, and use of the monocrystal in place of the ceramics as the material for the positive lens element G12 provides similar effects. Manufacturing conditions of the ceramics may necessitate slight variations in refractive index and Abbe number. Such variations, however, poses no practical problems.

The use of the material of a high refractive index for the positive lens element G12 of the first lens unit L1 causes a change in Petzval sum of the entire lens system in a negative direction.

The change in Petzval sum can be corrected easily by providing a higher refractive index to the material of the negative lens element included in the first lens unit L1 or the lens units closer to the image than the second lens unit L2, or by providing a lower refractive index to the material of the positive lens element included therein.

The second lens unit L2 includes three lens elements, i.e., a negative lens element G21 having a meniscus shape and a concave image side surface, a biconcave negative lens element G22, and a positive lens element G23 having a meniscus shape and a convex object side surface. The second lens unit L2 suppresses aberration variation accompanying zooming.

The third lens unit L3 includes three lens elements, i.e., a positive lens element G31 having a convex object side surface, a negative lens element G32 having a concave image side surface, and a biconvex positive lens element G33.

The positive lens element G31 corrects spherical aberration well by its object side surface formed as an aspheric surface. The positive lens element G33 mainly corrects spherical aberration and astigmatism well by its object side surface formed as an aspheric surface.

The aperture stop SP is disposed in the third lens element L3 to shorten a distance between the second and third lens units L2 and L3 at the telephoto end. Thus, the entire lens length is reduced.

The fourth lens unit L4 is constituted by a cemented lens element formed by cementing a biconvex positive lens element G41 with a negative lens element G42 having a meniscus shape and a convex image side surface. The cemented lens element of the positive and negative lens elements suppresses aberration variation accompanying the movement of the fourth lens unit L4 during zooming and focusing.

Next, the zoom lens of Embodiment 2 shown in FIG. 5 will be described. The basic lens configuration of this embodiment including the sign of the refractive power of each lens unit and the movement conditions of the lens units during zooming are identical to those of Embodiment 1 shown in FIG. 1.

Embodiment 2 is different from Embodiment 1 in that a second lens unit L2 is constituted by four lens elements including one additional negative lens element. As a result, the refractive power and aberration correction capability of the second lens unit L2 which is a magnification-varying lens unit are enhanced, thereby realizing a higher zoom ratio of 34.

Further, Embodiment 2 is different from Embodiment 1 in that a third lens unit L3 includes two lens elements, i.e., a positive lens element and a negative lens element, and an aperture stop SP is disposed closer to the object side than (on the object side of) the third lens unit L3.

The disposition of the aperture stop SP on the object side of the third lens unit L3 enables an entrance pupil to be located closer to the object, thereby reducing the diameter of the first lens unit L1.

A positive lens element G13 of the first lens unit L1 corresponds to the positive lens element G1*pa*.

As the material for the positive lens element G13 of the first lens unit L1, YAG identical to that of the lens element G12 of Embodiment 1 is used.

The YAG has a higher refractive index than that of a normal optical glass material having an almost equal level of dispersion. Thus, a large refractive power can be easily provided to the positive lens element G13 without increasing spherical and achromatic aberrations. As a result, an effect of reducing a lens thickness is added to facilitate the miniaturization of the entire lens system.

Next, the zoom lens of Embodiment 3 shown in FIG. 9 will be described. The basic lens configuration of this embodiment including the number of the lens units and the refractive power arrangement are identical to those of Embodiment 1. The zoom lens of Embodiment 3 performs zooming by moving all four lens units.

A first lens unit L1 includes one positive lens element G11 having a convex object side surface. The positive lens element G11 corresponds to the positive lens element G1pa.

As the material for the positive lens element G11, YAG whose refractive index and Abbe number satisfy the conditional expressions (1) and (2) is used.

A larger refractive power is provided to the positive lens element G11, i.e., the first lens unit L1 by utilizing characteristics of the YGA in which its refractive index is higher and its dispersion is lower than those of normal optical glass materials while suppressing the occurrence of spherical and chromatic aberrations in the first lens unit L1. As a result, a zoom ratio of the second lens unit L2 is increased to miniaturize the entire lens system.

The second lens unit L2 includes three lens elements, i.e., a negative lens element G21 having a meniscus shape and a concave image side surface, a biconcave negative lens element G22, and a positive lens element G23 having a convex object side surface.

The third lens unit L3 includes two lens elements, i.e., a biconvex positive lens element G31, and a cemented lens element formed by cementing a positive lens element G32 having a meniscus shape and a convex object side surface with a negative lens element G33 having a meniscus shape and a concave image side surface. The cemented lens element has a negative combined refractive power.

The positive lens element G31 corrects spherical aberration well by its object side surface formed as an aspheric surface.

The fourth lens unit L4 is constituted by one positive lens element G41 whose object side surface has a stronger curvature than that of its image side surface.

Next, the zoom lens of Embodiment 4 shown in FIG. 13 will be described. The basic lens configuration of this embodiment including the sign of the refractive power of each lens unit and the movement conditions of the lens units during zooming are identical to those of Embodiment 1 shown in FIG. 1.

In Embodiment 4, a negative lens element G11 of a first lens unit L1 corresponds to the negative lens element G1na. As the material for the negative lens element G11, transparent ceramics "LUMI-CERA" (registered trademark) made by Murata Manufacturing Company. Ltd., is used whose refractive index and Abbe number satisfy the conditional expressions (1) and (2).

The "LUMI-CERA" has characteristics that its refractive index nd for the d-line is 2.095 which is high, and its Abbe number vd for the d-line is 29.4, and is characterized by being present within a region where no general optical glass materials are present in an nd-vd diagram and by having a refractive index higher than that of the general optical glass materials having an almost equal level of dispersion.

The use of the material having a high refractive index for the negative lens element G11 of the first lens unit L1 enables further reduction of the curvature of a first lens surface (object side surface of the negative lens element G11). As a result, at the telephoto end where axial rays pass through the negative lens element G11 at a high ray height, an incident angle of the axial rays can be reduced, thereby suppressing the occurrence of spherical aberration at the telephoto end.

Thus, a high zoom ratio can be easily achieved.

Further, a difference in refractive index between the negative and positive lens elements G11 and G12 can be increased. Thus, the capability of correcting various aberrations in a cemented lens surface can be enhanced, and variation of spherical aberration during variation of magnification can be suppressed.

In the zoom lens of this embodiment which performs variation of magnification mainly by the second lens unit L2 having a negative refractive power, to achieve miniaturization of the entire lens system and a high zoom ratio, it is necessary that a negative refractive power of the second lens unit L2 be increased to reduce its movement amount during the variation of magnification.

When increasing the zoom ratio and the negative refractive power of the second lens unit L2, Petzval sum tends to take a negative value.

Increasing a refractive index of a material of a negative lens unit included in the second lens unit L2 enables correction of Petzval sum to a certain extent. However, dispersion of the material of the negative lens element is increased, thereby causing incomplete correction of chromatic aberration at the second lens unit L2. Consequently, variation of chromatic aberration of magnification during variation of magnification is increased.

Reducing a refractive index of a material of a positive lens element enables correction of Petzval sum to a certain extent in a plus direction. However, a curvature of a surface of the positive lens is increased to cause a difficulty of correcting spherical aberration and an increase of the thickness of the positive lens element, which increases the size of the entire lens system.

Thus, in this embodiment, a material of a high refractive index is used for the negative lens element G11 of the first lens unit L1 to correct Petzval sum in the plus direction, which is changed in the minus direction by increasing the zoom ratio. Thereby, a high zoom ratio is achieved while correcting field curvature.

Next, the zoom lens of Embodiment 5 shown in FIG. 17 will be described. The basic lens configuration of this embodiment including the sign of the refractive power of each lens unit and the movement conditions of the lens units during zooming are identical to those of Embodiment 3 shown in FIG. 9.

Embodiment 5 is different from Embodiment 3 in that a first lens unit L1 is constituted by a cemented lens element formed by cementing a negative lens unit G11 with a positive lens unit G12, thereby increasing a refractive power and aberration correction capability of the first lens unit L1 to realize a higher zoom ratio. In Embodiment 5, the negative lens element G11 corresponds to the negative lens element G1na, and the positive lens element G12 corresponds to the positive lens element G1pa.

In Embodiment 5, as the material for the negative lens element G11, transparent ceramics "LUMI-CERA" (registered trademark) made by Murata Manufacturing Company Ltd., is used whose refractive index and Abbe number satisfy the conditional expressions (1) and (2).

As the material for the positive lens element G12, YAG whose refractive index and Abbe number satisfy the conditional expressions (1) and (2) is used.

As described above, the materials that satisfy the conditional expressions (1) and (2) are used for the positive and negative lens elements of the first lens unit L1. Thus, the combination of the above-described effects of using such a material for the positive lens element with the above-described effects of using such a material for the negative lens element reduces spherical and longitudinal chromatic aberrations at the telephoto end and realizes miniaturization of the entire lens system and a high zoom ratio.

Next, the zoom lens of Embodiment 6 shown in FIG. 21 will be described. The basic lens configuration of this embodiment including the sign of the refractive power of each lens unit and the movement conditions of the lens units during zooming are identical to those of Embodiment 2 shown in FIG. 5.

A negative lens element G11 corresponds to the negative lens element G1*na*, and each of positive lens elements G12 and G13 corresponds to the positive lens element G1*pa*.

In Embodiment 6, a material whose refractive index and Abbe number satisfy the conditional expressions (1) and (2) is used for the negative lens element G11 of the first lens unit L1, and YAG whose refractive index and Abbe number satisfy the conditional expressions (1) and (2) is used for the positive lens elements G12 and G13.

Use of the materials whose refractive indexes and the Abbe numbers satisfy the conditional expressions (1) and (2) for all the three lenses of the first lens unit L1 increases the refractive power of the first lens unit L1 while suppressing spherical and longitudinal chromatic aberrations at the telephoto end. Thus, a high zoom ratio higher than 37 and miniaturization of the entire lens system can be achieved.

In Embodiment 6, the negative lens element G11 and the positive lens elements G12 and G13 are formed to have a meniscus shape having a convex object side surface.

In the first lens unit L1, light rays passing through a peripheral portion which is a high portion from the optical axis of the zoom lens include marginal rays which are axial rays at the telephoto end, and off-axis rays at the middle zoom position slightly closer to the telephoto end from the wide-angle end.

The amount of aberrations generated in the lens is larger for light rays at a high position from the optical axis. Thus, the lens is preferably formed to have a shape advantageous for the marginal rays and the off-axis rays in view of aberration correction.

The axial rays at the telephoto end are substantially parallel to the optical axis. Thus, in view of spherical aberration correction at the telephoto end, curvatures of lens surfaces of the first lens unit Li are preferably weak.

On the other hand, the off-axis rays at the middle zoom position enter the first lens unit L1 at a large incident angle with respect to the optical axis. Thus, forming each lens element of the first lens unit L1 into a meniscus shape can reduce the incident angle of the off-axis rays to the first lens unit L1. This lens configuration is advantages for correcting aberrations for the off-axis rays, especially astigmatism.

Thus, the meniscus shape of the lens elements of the first lens unit L1 whose curvatures are as weak as possible is advantageous for correcting aberrations in the entire zoom range. However, the meniscus shape reduces the refractive power of the first lens unit L1, which prevents miniaturization of the entire lens system.

On the other hand, use of materials having a high refractive index and low dispersion which satisfy the conditional expressions (1) and (2) for the negative and positive lens elements of the first lens unit L1 can form a meniscus shape having curvatures weaker as compared with a case where the normal glass materials are used, while maintaining a positive refractive power of the first lens unit L1.

Thus, a high zoom ratio of the zoom lens and miniaturization of the entire lens system which cannot be achieved by using the normal glass materials are easily achieved, and therefore realizing a compact zoom lens having a zoom ratio higher than 37.

Next, the zoom lens of Embodiment 7 shown in FIG. 25 will be described.

The zoom lens of Embodiment 7 includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power.

During zooming from the wide-angle end to the telephoto end, the second lens unit L2 is moved toward the image to mainly perform variation of magnification, and the fourth lens unit L4 is moved along a movement track convex toward the image to mainly correct variation of an image plane accompanying the variation of magnification.

The first lens unit L1 includes a negative lens element G11 having a meniscus shape and a convex object side surface, a positive lens element G12 having a meniscus shape similar to a planoconvex shape and a convex object side surface, and a positive lens element G13 having a meniscus shape and a convex object side surface.

The three-lens configuration of the first lens unit L1 enables good correction of spherical aberration and good correction of longitudinal chromatic aberration and chromatic aberration of magnification of each color while having a high zoom ratio. The negative and positive lens elements G11 and G12 are separated from each other with an air space therebetween, thereby increasing a freedom degree of aberration correction.

The positive lens element G12 corresponds to the positive lens element G1*pa*.

As the material for the positive lens unit G12, YAG whose refractive index and Abbe number satisfy the conditional expressions (1) and (2) is used.

Thus, at the telephoto end, chromatic and spherical aberrations are corrected well, realizing a compact zoom lens having a zoom ratio higher than 20.

The configuration of the second lens unit L2 is similar to that of Embodiment 1.

The third lens unit L3 includes, in order from the object side to the image side, a positive lens element G31 having a biconvex shape, and a cemented lens element formed by cementing a positive lens element G32 having a biconvex shape with a negative lens element G33 having a meniscus shape and a convex image side surface. The cemented lens element has a positive combined refractive power.

The fourth lens unit L4 includes a cemented lens element formed by cementing a positive lens element G41 having a meniscus shape and a convex image side surface with a biconcave lens element G42. The fourth lens unit L4 corrects variation of chromatic aberration accompanying zooming and focusing well.

The fifth lens unit L5 includes a cemented lens element formed by cementing a negative lens element G51 having a meniscus shape and a convex object side surface with a biconvex lens element G52. The positive lens element G52 has an aspheric image side surface, and thereby field curvature and astigmatism are corrected well.

In the zoom lens of Embodiment 7, variation of distortion accompanying zooming is large. However, in a case where the zoom lens is used for an electronic image-pickup apparatus having a solid-state image-pickup element, the distortion may be electrically corrected when digital processing of a captured image is performed.

Next, numerical examples 1 to 7 corresponding to Embodiments 1 to 7 of the present invention will be described.

In each numerical example, a surface number i denotes an order of optical surfaces from the object side. Reference character ri denotes a curvature radius of an i-th optical surface. Reference character di denotes a distance between the i-th surface and an i+1-th surface. Reference characters ndi and vdi respectively denote a refractive index and an Abbe number of a material of an i-th optical member for the d-line.

A back focus (BF) is an air-equivalent value of a distance from a most-image side surface of the zoom lens to a paraxial image plane. A total lens length is represented by a value obtained by adding the back focus (BF) to the distance from a most-object side surface to the most-image side surface. A length is expressed by mm.

An aspheric shape is represented by the following expression, where K denotes an eccentricity, A4 to A13 denote aspheric coefficients, and x denotes a displacement in the optical axis direction at a height position H from the optical axis with reference to an apex of the surface. R denotes a curvature radius.

$$X = \frac{(1/R)H^2}{1 + \sqrt{1 - (1+K)(H/R)^2}} + A4H^4 + A6H^6 + A8H^8 +$$
$$A10H^{10} + A12H^{12} + A5H^5 + A7H^7 + A9H^9 + A11H^{11} + A13H^{13}$$

In aspheric surface data, "E-Z" means "x10-z". Table 1 shows the values of the above-described conditional expressions in each numerical example.

f denotes a focal length, Fno denotes an F-number, and ω denotes a half-field angle.

NUMERICAL EXAMPLE 1

SURFACE DATA

| surface no. | r | d | nd | vd |
|---|---|---|---|---|
| object | ∞ | ∞ | | |
| 1 | 44.94323 | 1.10000 | 1.922860 | 20.9 |
| 2 | 24.87922 | 3.40000 | 1.830000 | 59.0 |
| 3 | −311.66846 | 0.17000 | | |
| 4 | 16.91453 | 2.10000 | 1.651597 | 58.6 |
| 5 | 29.24701 | variable | | |
| 6 | 63.67081 | 0.70000 | 1.882997 | 40.8 |
| 7 | 5.89294 | 2.25000 | | |
| 8 | −21.44479 | 0.60000 | 1.603112 | 60.6 |
| 9 | 11.64233 | 0.75000 | | |
| 10 | 10.52093 | 1.30000 | 1.922860 | 18.9 |
| 11 | 28.99573 | variable | | |
| 12* | 8.44269 | 2.20000 | 1.693500 | 53.2 |
| 13 | 45.79602 | 1.30000 | | |
| 14 (aperture stop) | ∞ | 2.20000 | | |
| 15 | 97.99307 | 0.60000 | 1.761821 | 26.5 |
| 16 | 8.37410 | 0.30000 | | |
| 17* | 12.47224 | 1.75000 | 1.583126 | 59.4 |
| 18 | −27.34674 | variable | | |
| 19 | 12.29636 | 2.70000 | 1.772499 | 49.6 |
| 20 | −12.20927 | 0.60000 | 1.846660 | 23.9 |
| 21 | −60.76956 | variable | | |
| 22 | ∞ | 2.00000 | 1.516330 | 64.1 |
| 23 | ∞ | 1.71844 | | |
| image plane | ∞ | | | |

ASPHERIC SURFACE DATA surface 12

K = 2.74483E−01, A4 = −1.79594E−04, A6 = −2.82547E−06 surface 17

K = −2.26672, A4 = 1.00000E−05

ZOOM LENS DATA

| | zoom ratio | 9.6600 | |
|---|---|---|---|
| | wide-angle end | middle | telephoto end |
| focal length | 5.0000 | 20.3823 | 48.2999 |
| F-number | 1.85 | 2.70 | 3.01 |
| field angle | 27.83° | 7.38° | 3.13° |
| image height | 2.64 | 2.64 | 2.64 |
| total lens length | 58.8035 | 58.8035 | 58.8035 |
| BF | 8.2944 | 10.2099 | 5.3366 |
| d5 | 0.70000 | 12.12237 | 16.13564 |
| d11 | 16.47378 | 5.05141 | 1.03814 |
| d18 | 4.31536 | 2.39985 | 7.27320 |
| d21 | 5.25699 | 7.17251 | 2.29916 |

LENS UNIT DATA

| Lens unit | most-object side surface | focal length | magnification ratio (wide-angle end) | magnification ratio (telephoto end) |
|---|---|---|---|---|
| 1 | 1 | 27.41611 | 0 | 0 |
| 2 | 6 | −6.31700 | −0.3798 | −5.2872 |
| 3 | 12 | 17.27190 | −1.5598 | −0.6484 |
| 4 | 19 | 14.35338 | 0.3078 | 0.5139 |

NUMERICAL EXAMPLE 2

SURFACE DATA

| surface no. | r | d | nd | vd |
|---|---|---|---|---|
| object | ∞ | ∞ | | |
| 1 | 49.68739 | 1.55000 | 1.846660 | 23.9 |
| 2 | 25.12842 | 6.50000 | 1.696797 | 55.5 |
| 3 | −1729.79837 | 0.15000 | | |
| 4 | 22.95080 | 3.00000 | 1.830000 | 55.5 |
| 5 | 46.68457 | variable | | |
| 6 | 30.14527 | 0.70000 | 2.003300 | 28.3 |
| 7 | 4.83006 | 2.65000 | | |
| 8 | −18.55234 | 0.55000 | 1.882997 | 40.8 |
| 9 | 31.55988 | 0.47000 | | |
| 10 | 9.84009 | 2.40000 | 1.922860 | 18.9 |
| 11 | −27.02062 | 0.19158 | | |
| 12 | −16.28005 | 0.50000 | 1.772499 | 49.6 |
| 13 | 18.04116 | variable | | |
| 14 (aperture stop) | ∞ | 0.60000 | | |
| 15* | 11.32193 | 5.50000 | 1.693500 | 53.2 |
| 16* | −18.18735 | 0.15000 | | |
| 17 | 71.04026 | 0.80000 | 1.846660 | 23.9 |
| 18 | 11.99239 | variable | | |
| 19 | 14.22355 | 3.00000 | 1.517417 | 52.4 |
| 20 | −7.53774 | 0.50000 | 1.846660 | 23.9 |
| 21 | −12.54537 | variable | | |
| 22 | ∞ | 2.50000 | 1.516330 | 64.1 |
| 23 | ∞ | 2.59916 | | |
| image plane | ∞ | | | |

ASPHERIC SURFACE DATA surface 15

K = −7.89114E−01, A5 = −1.23901E−06, A7 = −7.85814E−08,
A9 = 4.32890E−09,

-continued

A11 = −4.74759E−11, A13 = −9.62495E−15
surface 16

K = −1.11433E+01, A5 = −4.76449E−06, A7 = 2.83204E−07,
A9 = −3.15298E−09,
A11 = −1.25945E−12

ZOOM LENS DATA

| zoom ratio | 33.9934 | | |
|---|---|---|---|
| | wide-angle end | middle | telephoto end |
| focal length | 3.5301 | 13.5231 | 120.0000 |
| F-number | 1.44 | 2.14 | 4.47 |
| field angle | 32.51° | 9.45° | 1.07° |
| image height | 2.25 | 2.25 | 2.25 |
| total lens length | 78.7449 | 78.7449 | 78.7449 |
| BF | 10.1989 | 16.0116 | 6.9572 |
| d5 | 0.88000 | 14.23147 | 22.76765 |
| d13 | 24.80688 | 11.45541 | 2.91923 |
| d18 | 12.74753 | 6.93479 | 15.98924 |
| d21 | 5.95102 | 11.76375 | 2.70930 |

LENS UNIT DATA

| Lens unit | most-object side surface | focal length | magnification ratio (wide-angle end) | magnification ratio (telephoto end) |
|---|---|---|---|---|
| 1 | 1 | 33.14114 | 0 | 0 |
| 2 | 6 | −4.29030 | −0.1912 | −7.7263 |
| 3 | 15 | 20.53690 | −1.7653 | −0.9303 |
| 4 | 19 | 17.23578 | 0.3156 | 0.5037 |

NUMERICAL EXAMPLE 3

SURFACE DATA

| surface no. | r | d | nd | νd |
|---|---|---|---|---|
| object | ∞ | ∞ | | |
| 1 | 29.03236 | 1.95000 | 1.830000 | 59.0 |
| 2 | 361.46208 | variable | | |
| 3 | 43.30611 | 0.75000 | 1.882997 | 40.8 |
| 4 | 7.43068 | 3.20000 | | |
| 5 | −44.95277 | 0.70000 | 1.834807 | 42.7 |
| 6 | 23.04121 | 0.65000 | | |
| 7 | 14.66845 | 2.00000 | 1.846660 | 23.9 |
| 8 | 306.51010 | variable | | |
| 9 (aperture stop) | ∞ | 0.80000 | | |
| 10* | 7.77952 | 2.00000 | 1.693500 | 53.2 |
| 11 | −73.84500 | 0.20000 | | |
| 12 | 10.01787 | 2.44000 | 1.696797 | 55.5 |
| 13 | 26.22635 | 0.60000 | 1.846660 | 23.9 |
| 14 | 4.95903 | 1.00000 | | |
| 15 (flare-cutting stop) | ∞ | variable | | |
| 16* | 14.29660 | 2.40000 | 1.740130 | 49.3 |
| 17 | 2942.84542 | variable | | |
| 18 | ∞ | 1.34000 | 1.516330 | 64.1 |
| 19 | ∞ | 1.05653 | | |
| image plane | ∞ | | | |

ASPHERIC SURFACE DATA surface 10

K = −1.77968, A4 = 2.34400E−04, A6 = −8.25752E−07,
A8 = −3.09637E−08
surface 16

K = −2.06255, A4 = 6.52119E−05, A6 = −7.88598E−08,
A8 = 1.46548E−09

ZOOM LENS DATA

| zoom ratio | 3.9829 | | |
|---|---|---|---|
| | wide-angle end | middle | telephoto end |
| focal length | 7.5277 | 13.4557 | 28.9817 |
| F-number | 2.88 | 3.42 | 4.24 |
| field angle | 30.94° | 18.54° | 8.85° |
| image height | 4.512 | 4.512 | 4.512 |
| total lens length | 51.6564 | 51.1266 | 62.1662 |
| BF | 8.2402 | 10.3825 | 11.3115 |
| d2 | 0.40000 | 4.73517 | 12.32247 |
| d8 | 18.26571 | 8.64734 | 1.89877 |
| d15 | 4.66050 | 7.27162 | 16.54343 |
| d17 | 5.50000 | 7.64222 | 8.57123 |

LENS UNIT DATA

| Lens unit | most-object side surface | focal length | magnification ratio (wide-angle end) | magnification ratio (telephoto end) |
|---|---|---|---|---|
| 1 | 1 | 37.93266 | 0 | 0 |
| 2 | 3 | −11.04148 | −0.4351 | −0.8207 |
| 3 | 10 | 16.50600 | −0.9050 | −2.6932 |
| 4 | 16 | 19.40387 | 0.5039 | 0.3456 |

NUMERICAL EXAMPLE 4

SURFACE DATA

| surface no. | r | d | nd | νd |
|---|---|---|---|---|
| object | ∞ | ∞ | | |
| 1 | 35.34824 | 1.15000 | 2.095000 | 29.4 |
| 2 | 18.89327 | 4.60000 | 1.592400 | 68.3 |
| 3 | −462.33550 | 0.17000 | | |
| 4 | 18.19543 | 3.25000 | 1.696797 | 55.5 |
| 5 | 100.74837 | variable | | |
| 6 | 57.14802 | 0.70000 | 1.882997 | 40.8 |
| 7 | 5.44873 | 2.30000 | | |
| 8 | −21.33697 | 0.60000 | 1.589130 | 61.1 |
| 9 | 12.29605 | 0.68000 | | |
| 10 | 9.96332 | 1.30000 | 1.922860 | 18.9 |
| 11 | 25.22782 | variable | | |
| 12* | 8.21640 | 2.20000 | 1.693500 | 53.2 |
| 13 | 39.96669 | 1.30000 | | |
| 14 (aperture stop) | ∞ | 2.20000 | | |
| 15 | 17.98871 | 0.60000 | 1.808095 | 22.8 |
| 16 | 7.32207 | 0.30000 | | |
| 17* | 16.39284 | 1.70000 | 1.583126 | 59.4 |
| 18 | −125.78137 | variable | | |
| 19 | 10.73560 | 2.75000 | 1.772499 | 49.6 |
| 20 | −11.53581 | 0.60000 | 1.846660 | 23.9 |
| 21 | −61.29131 | variable | | |
| 22 | ∞ | 2.00000 | 1.516330 | 64.1 |
| 23 | ∞ | 0.50000 | | |
| image plane | ∞ | | | |

ASPHERIC SURFACE DATA surface 12

K = −2.39110E−01, A4 = −6.38329E−05, A6 = −2.20313E−06,
A8 = 3.96290E−08
surface 17

K = 1.08967, A4 = −1.77316E−04

ZOOM LENS DATA

| zoom ratio | 12.3703 |
|---|---|

-continued

|  | wide-angle end | middle | telephoto end |
|---|---|---|---|
| focal length | 4.8502 | 21.6739 | 59.9984 |
| F-number | 1.85 | 2.70 | 3.01 |
| field angle | 28.56° | 6.94° | 2.52° |
| image height | 2.64 | 2.64 | 2.64 |
| total lens length | 56.5775 | 56.5775 | 56.5775 |
| BF | 8.4535 | 10.4579 | 3.6112 |
| d5 | 0.70000 | 12.44849 | 16.57634 |
| d11 | 16.58036 | 4.83187 | 0.70402 |
| d18 | 4.44365 | 2.43920 | 9.28589 |
| d21 | 6.63450 | 8.63895 | 1.79226 |

LENS UNIT DATA

| Lens unit | most-object side surface | focal length | magnification ratio (wide-angle end) | magnification ratio (telephoto end) |
|---|---|---|---|---|
| 1 | 1 | 27.01512 | 0 | 0 |
| 2 | 6 | −6.09464 | −0.3670 | −8.3333 |
| 3 | 12 | 18.43591 | −2.3795 | −0.4561 |
| 4 | 19 | 12.78447 | 0.2056 | 0.5844 |

NUMERICAL EXAMPLE 5

SURFACE DATA

| surface no. | r | d | nd | vd |
|---|---|---|---|---|
| object | ∞ | ∞ | | |
| 1 | 29.35857 | 1.15000 | 2.095000 | 29.4 |
| 2 | 20.80064 | 4.10000 | 1.83000 | 59.0 |
| 3 | 158.16504 | variable | | |
| 4 | 32.93325 | 0.90000 | 1.882997 | 40.8 |
| 5 | 8.00027 | 4.75000 | | |
| 6 | −24.37164 | 0.75000 | 1.658441 | 50.9 |
| 7 | 38.21908 | 0.70000 | | |
| 8 | 18.43647 | 1.60000 | 1.922860 | 18.9 |
| 9 | 65.59441 | variable | | |
| 10 (aperture stop) | ∞ | 0.80000 | | |
| 11* | 11.14242 | 2.90000 | 1.583126 | 59.4 |
| 12* | −22.17583 | 0.20000 | | |
| 13 | 6.15396 | 2.44000 | 1.487490 | 70.2 |
| 14 | 14.25292 | 0.85000 | 1.805181 | 25.4 |
| 15 | 4.86983 | 1.00000 | | |
| 16 (flare-cutting stop) | ∞ | variable | | |
| 17 | 12.26968 | 2.50000 | 1.487490 | 70.2 |
| 18 | 268.50377 | variable | | |
| 19 | ∞ | 1.28000 | 1.516330 | 64.1 |
| 20 | ∞ | 0.49976 | | |
| image plane | ∞ | | | |

ASPHERIC SURFACE DATA surface 11

$K = -8.44270E-01, A4 = -7.50417E-05, A6 = -3.15793E-07,$
$A8 = -5.26465E-08,$
$A10 = -2.90595E-09$ surface 12

$K = -1.37996, A4 = -4.94528E-07, A6 = 1.84265E-07,$
$A8 = -1.31698E-07,$
$A10 = -6.15376E-10$

ZOOM LENS DATA

| | zoom ratio | 5.7319 | |
|---|---|---|---|
| | wide-angle end | middle | telephoto end |
| focal length | 7.5941 | 19.8449 | 43.5285 |
| F-number | 2.88 | 3.61 | 4.87 |
| field angle | 31.36° | 13.13° | 6.07° |

-continued

| | wide-angle end | middle | telephoto end |
|---|---|---|---|
| image height | 4.629 | 4.629 | 4.629 |
| total lens length | 60.4644 | 62.4548 | 74.5041 |
| BF | 5.0003 | 9.2602 | 6.2429 |
| d3 | 0.30000 | 11.20167 | 19.32764 |
| d9 | 22.31348 | 6.93307 | 2.32569 |
| d16 | 8.25059 | 10.45985 | 22.00786 |
| d18 | 3.65645 | 7.91633 | 4.89900 |

LENS UNIT DATA

| Lens unit | most-object side surface | focal length | magnification ratio (wide-angle end) | magnification ratio (telephoto end) |
|---|---|---|---|---|
| 1 | 1 | 50.07550 | 0 | 0 |
| 2 | 4 | −11.15245 | −0.3273 | −0.7411 |
| 3 | 11 | 15.21537 | −0.6236 | −1.6858 |
| 4 | 17 | 26.29025 | 0.7430 | 0.6958 |

NUMERICAL EXAMPLE 6

SURFACE DATA

| surface no. | r | d | nd | vd |
|---|---|---|---|---|
| object | ∞ | ∞ | | |
| 1 | 46.17511 | 1.45000 | 2.180000 | 30.0 |
| 2 | 24.00867 | 5.80000 | 1.830000 | 59.0 |
| 3 | 237.51436 | 0.15000 | | |
| 4 | 24.05337 | 3.50000 | 1.830000 | 55.5 |
| 5 | 68.08192 | variable | | |
| 6 | 24.47196 | 0.70000 | 2.003300 | 28.3 |
| 7 | 4.62238 | 2.65000 | | |
| 8 | −16.14275 | 0.55000 | 1.882997 | 40.8 |
| 9 | 36.29418 | 0.45000 | | |
| 10 | 9.84248 | 2.30000 | 1.922860 | 18.9 |
| 11 | −31.05346 | 0.19625 | | |
| 12 | −17.37440 | 0.50000 | 1.772499 | 49.6 |
| 13 | 18.85440 | variable | | |
| 14 (aperture stop) | ∞ | 0.60000 | | |
| 15* | 11.58017 | 5.50000 | 1.693500 | 53.2 |
| 16* | −18.33363 | 0.15000 | | |
| 17 | 67.16966 | 0.80000 | 1.846660 | 23.9 |
| 18 | 12.28976 | variable | | |
| 19 | 14.60839 | 3.85000 | 1.517417 | 52.4 |
| 20 | −7.46088 | 0.50000 | 1.846660 | 23.9 |
| 21 | −12.39644 | variable | | |
| 22 | ∞ | 2.50000 | 1.516330 | 64.1 |
| 23 | ∞ | 2.59528 | | |
| image plane | ∞ | | | |

ASPHERIC SURFACE DATA surface 15

$K = -8.75470E-01, A5 = -1.50137E-07, A7 = -9.41021E-08,$
$A9 = 4.38545E-09, A11 = -4.74233E-11, A13 = 4.76488E-14$ surface 16

$K = -1.06523E+01, A5 = -4.77242E-06, A7 = 2.58060E-07,$
$A9 = -2.61728E-09, A11 = -6.15950E-13$

ZOOM LENS DATA

| | zoom ratio | 37.1395 | |
|---|---|---|---|
| | wide-angle end | middle | telephoto end |
| focal length | 3.5003 | 13.6219 | 129.9995 |
| F-number | 1.44 | 2.18 | 4.45 |
| field angle | 32.51° | 9.38° | 1.07° |
| image height | 2.25 | 2.25 | 2.25 |
| total lens length | 79.1489 | 79.1489 | 79.1489 |

-continued

| | | | |
|---|---|---|---|
| BF | 10.2501 | 16.7025 | 6.9435 |
| d5 | 0.65000 | 14.36067 | 23.12650 |
| d13 | 24.65644 | 10.94577 | 2.17994 |
| d18 | 13.94613 | 7.49367 | 17.25271 |
| d21 | 6.00607 | 12.45854 | 2.69950 |

LENS UNIT DATA

| Lens unit | most-object side surface | focal length | magnification ratio (wide-angle end) | magnification ratio (telephoto end) |
|---|---|---|---|---|
| 1 | 1 | 33.36071 | 0 | 0 |
| 2 | 6 | −4.19566 | −0.1823 | −7.8405 |
| 3 | 15 | 20.50245 | −1.7872 | −0.9705 |
| 4 | 19 | 17.39000 | 0.3220 | 0.5121 |

NUMERICAL EXAMPLE 7

SURFACE DATA

| surface no. | r | d | nd | vd |
|---|---|---|---|---|
| object | ∞ | ∞ | | |
| 1 | 49.38630 | 1.20000 | 1.846660 | 29.4 |
| 2 | 28.39763 | 0.12827 | | |
| 3 | 29.34852 | 3.50000 | 1.830000 | 59.0 |
| 4 | 734.29207 | 0.15000 | | |
| 5 | 25.76807 | 2.20000 | 1.487490 | 70.2 |
| 6 | 65.14833 | variable | | |
| 7 | 30.53921 | 0.60000 | 1.882997 | 40.8 |
| 8 | 6.67815 | 2.15000 | | |
| 9 | −9.34365 | 0.60000 | 1.804000 | 46.6 |
| 10 | 16.16627 | 0.85000 | | |
| 11 | 18.17120 | 1.80000 | 1.808095 | 22.8 |
| 12 | −33.66452 | variable | | |
| 13 (aperture stop) | ∞ | 1.30000 | | |
| 14 | 59.09637 | 2.40000 | 1.719995 | 50.2 |
| 15 | −20.71318 | 0.20000 | | |
| 16 | 25.37819 | 4.40000 | 1.696797 | 55.5 |
| 17 | −9.45301 | 0.70000 | 1.846660 | 23.9 |
| 18 | −33.54028 | variable | | |
| 19 | −12.36401 | 1.80000 | 1.846660 | 23.9 |
| 20 | −7.36880 | 0.60000 | 1.603112 | 60.6 |

-continued

| | | | | |
|---|---|---|---|---|
| 21 | 19.13063 | variable | | |
| 22 | 15.19297 | 0.60000 | 1.846660 | 23.9 |
| 23 | 7.54403 | 6.80000 | 1.583126 | 59.4 |
| 24* | −9.23242 | 5.00000 | | |
| 25 | ∞ | 2.00000 | 1.516330 | 64.1 |
| 26 | ∞ | 2.60076 | | |
| image plane | ∞ | | | |

ASPHERIC SURFACE DATA
surface 24

K = −1.26921, A4 = 1.85516E−04, A6 = −7.25684E−07,
A8 = −7.90180E−08, A10 = 1.01940E−09

ZOOM LENS DATA

| zoom ratio | 20.4487 | | |
|---|---|---|---|
| | wide-angle end | middle | telephoto end |
| focal length | 3.9122 | 17.8500 | 79.9994 |
| F-number | 1.83 | 2.33 | 3.69 |
| field angle | 32.06° | 7.82° | 1.75° |
| image height | 2.45 | 2.45 | 2.45 |
| total lens length | 82.4471 | 82.4471 | 82.4471 |
| BF | 8.9197 | 8.9197 | 8.9197 |
| d6 | 0.50000 | 17.21963 | 27.03909 |
| d12 | 27.76047 | 11.04084 | 1.22138 |
| d18 | 2.36314 | 7.42124 | 2.14799 |
| d21 | 10.92557 | 5.86747 | 11.14072 |

LENS UNIT DATA

| Lens unit | most-object side surface | focal length | magnification ratio (wide-angle end) | magnification ratio (telephoto end) |
|---|---|---|---|---|
| 1 | 1 | 38.60000 | 0 | 0 |
| 2 | 7 | −6.18383 | −0.2220 | −4.7181 |
| 3 | 14 | 12.52021 | −0.4143 | −0.3977 |
| 4 | 19 | −14.87151 | 5.5809 | 5.5954 |
| 5 | 22 | 12.88148 | 0.1974 | 0.1974 |

TABLE 1

| Conditional expression | numerical example 1 | numerical example 2 | numerical example 3 | numerical example 4 | numerical example 5 | numerical example 6 | numerical example 7 |
|---|---|---|---|---|---|---|---|
| (1) left side, (2) | 1.830 | 1.830 | 1.830 | 2.095 | 2.095/1.830 | 2.180/1.830 | 1.830 |
| (1) right side | 1.710 | 1.710 | 1.710 | 2.006 | 2.006/1.710 | 2.000/1.710 | 1.710 |
| (3) | 59.0 | 59.0 | 59.0 | — | 59.0 | 59.0 | 59.0 |
| (4) | 0.852 | 2.934 | 1.175 | — | 1.303 | 1.225/2.093 | 1.083 |
| (5) | 1.017 | 1.552 | 1.000 | — | 0.569 | 0.953/1.297 | 0.952 |
| (6) | — | — | — | 29.4 | 29.4 | 30.0 | — |
| (7) | — | — | — | −3.296 | −5.861 | −3.166 | — |
| (8) | — | — | — | 1.424 | 1.400 | 1.317 | — |
| (9) | 4.340 | 7.725 | 3.436 | 4.432 | 4.490 | 7.951 | 6.242 |

Each embodiment achieves a high-performance compact zoom lens having a high zoom ratio and being capable of correcting spherical aberration, comatic aberration, longitudinal chromatic aberration, chromatic aberration of magnification and field curvature well, which is applicable to a high-pixel digital camera and a high-pixel video camera.

Further, each embodiment provides a compact zoom lens which has excellent optical performance within the entire zoom range from the wide-angle end to the telephoto end and a high zoom ratio.

Next, referring to FIG. 29, an embodiment of a digital still camera which uses the zoom lens of each embodiment as an image-pickup optical system will be described.

Figure 29:
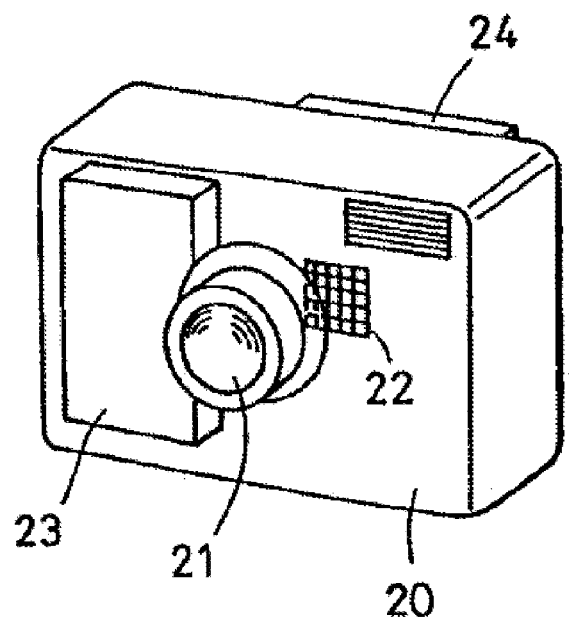
FIG. 29 is a view schematically showing a digital camera that includes the zoom lens of any one of Embodiment 1 to 7.

In FIG. 29, reference numeral 20 denotes a camera body, and reference numeral 21 denotes an image-pickup optical system which is constituted by the zoom lens of any one of Embodiments 1 to 7.

Reference numeral 22 denotes a solid-state image-pickup element (photoelectric conversion element) such as a CCD sensor or a CMOS sensor which receives an object image formed by the image-pickup optical system 21. Reference numeral 23 denotes a memory which records image information corresponding to the object image photoelectrically converted by the solid-state image-pickup element 22.

Reference numeral 24 denotes a viewfinder which is formed by a liquid crystal display panel. A user can observe the object image formed on the solid-state image-pickup element 22.

Next, referring to FIG. 30, an embodiment of a video camera (optical apparatus) which uses the zoom lens of each embodiment as an image-pickup optical system will be described.

Figure 30:
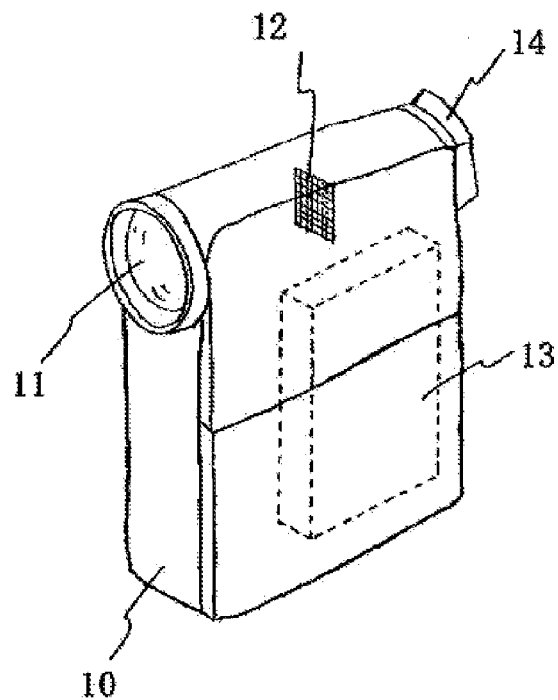
FIG. 30 is a view schematically showing a video camera that includes the zoom lens of any one of Embodiment 1 to 7.

In FIG. 30, reference numeral 10 denotes a video camera body, and reference numeral 11 denotes an image-pickup optical system which is constituted by the zoom lens of any one of Embodiments 1 to 7.

Reference numeral 12 denotes a solid-state image-pickup element (photoelectric conversion element) such as a CCD sensor or a CMOS sensor which receives an object image formed by the image-pickup optical system 11. Reference numeral 13 denotes a recording medium for recording image information corresponding to the object image photoelectrically converted by the solid-state image-pickup element 12.

Reference numeral 14 denotes a viewfinder for observing the object image displayed in a display device (not shown).

The display device is constituted by a liquid crystal panel or the like, and displays the object image formed on the image-pickup element 12.

Thus, applying the zoom lens of each embodiment to the image-pickup apparatus such as a digital still camera and a video camera can realize a compact image-pickup apparatus having high optical performance.

Furthermore, the present invention is not limited to these embodiments and various variations and modifications may be made without departing from the scope of the present invention.

This application claims the benefit of Japanese Patent Application No. 2007-280207, filed on Oct. 29, 2007, which is hereby incorporated by reference herein in its entirety.

What is claimed is:

1. A zoom lens comprising, in order from an object side to an image side:
   a first lens unit having a positive refractive power;
   a second lens unit having a negative refractive power; and
   a rear unit which includes at least one lens unit,
   wherein at least the second lens unit moves during zooming such that a distance between the first and second lens units is larger at a telephoto end than at a wide-angle end,
   wherein the first lens unit includes at least a first lens element made of a material which satisfies the following conditions:

$Nd1a > 2.3 - 0.01 \cdot vd1a$ $1.65 < Nd1a < 2.70$ where $Nd1a$ denotes a refractive index for a d-line, and $vd1a$ denotes an Abbe number for the d-line, and
   wherein the first and second lens units satisfy the following condition:

$2.5 < |f1/f2| < 12.0$ where $f1$ denotes a focal length of the first lens unit, and $f2$ denotes a focal length of the second lens unit.

2. A zoom lens according to claim 1,
   wherein the first lens element has a positive refractive power, and satisfies the following conditions:

$vd1pa > 45$ $0.5 < (R1p + R2p)/(R2p - R1p) < 10.0$ where $vd1pa$ denotes an Abbe number of the material of the first lens element, and $R1p$ and $R2p$ respectively denote curvature radii of an object side surface and an image side surface of the first lens element.

3. A zoom lens according to claim 1,
   wherein the first lens element has a positive refractive power, and satisfies the following condition:

$0.3 < f1pa/f1 < 3.0$ where $f1pa$ denotes a focal length of the first lens element.

4. A zoom lens according to claim 1,
   wherein the first lens element has a negative refractive power, and satisfies the following conditions:

$vd1na < 45$ $-10.0 < (R1n + R2n)/(R2n - R1n) < -1.5$ where $vd1na$ denotes an Abbe number of the material of the first lens element, and $R1n$ and $R2n$ respectively denote curvature radii of an object side surface and an image side surface of the first lens element.

5. A zoom lens according to claim 1,
   wherein the first lens element has a negative refractive power, and satisfies the following condition:

$1.0 < |f1na/f1| < 3.0$ where $f1na$ denotes a focal length of the first lens element.

6. A zoom lens according to claim 1,
   wherein the second lens unit includes at least one positive lens element and at least one negative lens element.

7. A zoom lens according to claim 1,
   wherein, of the lens units constituting the rear unit, a third lens unit disposed closest to an object has a positive refractive power.

8. A zoom lens according to claim 1,
   wherein the first lens unit includes two or less positive lens elements.

9. A zoom lens according to claim 1,
   wherein the zoom lens forms an object image on a solid-state image-pickup element.

10. An image-pickup element comprising:
    a zoom lens according to claim 1; and
    a solid-state image-pickup element which receives an image formed by the zoom lens.

* * * * *